(12) United States Patent
Xu et al.

(10) Patent No.: US 10,920,146 B2
(45) Date of Patent: Feb. 16, 2021

(54) LIQUID CRYSTAL COMPOSITION AND DISPLAY DEVICE THEREOF

(71) Applicant: Jiangsu Hecheng Display Technology Co., Ltd., Yangzhong (CN)

(72) Inventors: Haibin Xu, Yangzhong (CN); Wenming Han, Yangzhong (CN); Shuang Xu, Yangzhong (CN); Panpan Wang, Yangzhong (CN); Li Wang, Yangzhong (CN)

(73) Assignee: Jiangsu Hecheng Display Technology Co., Ltd., Yangzhong (CN)

( * ) Notice: Subject to any disclaimer, the term of this patent is extended or adjusted under 35 U.S.C. 154(b) by 0 days.

(21) Appl. No.: 15/771,472

(22) PCT Filed: Nov. 16, 2016

(86) PCT No.: PCT/CN2016/106007
§ 371 (c)(1),
(2) Date: Apr. 27, 2018

(87) PCT Pub. No.: WO2017/084568
PCT Pub. Date: May 26, 2017

(65) Prior Publication Data
US 2018/0312757 A1    Nov. 1, 2018

(30) Foreign Application Priority Data
Nov. 19, 2015    (CN) .......................... 201510808198.0

(51) Int. Cl.
*G02F 1/1333* (2006.01)
*C09K 19/30* (2006.01)
*C09K 19/12* (2006.01)
*C09K 19/20* (2006.01)
*C09K 19/04* (2006.01)

(52) U.S. Cl.
CPC .......... *C09K 19/3003* (2013.01); *C09K 19/12* (2013.01); *C09K 19/20* (2013.01); *C09K 19/3066* (2013.01); *C09K 19/3068* (2013.01); *C09K 2019/044* (2013.01); *C09K 2019/122* (2013.01); *C09K 2019/301* (2013.01); *C09K 2019/3004* (2013.01); *C09K 2019/308* (2013.01); *C09K 2019/3009* (2013.01); *C09K 2019/3016* (2013.01); *C09K 2019/3021* (2013.01); *C09K 2019/3025* (2013.01); *C09K 2019/3027* (2013.01); *C09K 2019/3071* (2013.01); *C09K 2019/3074* (2013.01); *C09K 2019/3078* (2013.01)

(58) Field of Classification Search
CPC .... C09K 19/3003; C09K 19/12; C09K 19/20; C09K 19/3066; C09K 19/3068; C09K 2019/044; C09K 2019/122; C09K 2019/3004; C09K 2019/3009; C09K 2019/301; C09K 2019/3016; C09K 2019/3021; C09K 2019/3025; C09K 2019/3027; C09K 2019/3071; C09K 2019/3074; C09K 2019/3078; C09K 2019/308; G02F 1/1333
USPC .......................................... 252/99.63, 299.63
See application file for complete search history.

(56) References Cited

U.S. PATENT DOCUMENTS

| | | | | |
|---|---|---|---|---|
| 6,027,665 A | * | 2/2000 | Pausch ............... | C09K 19/3001 252/299.61 |
| 7,851,032 B2 | | 12/2010 | Saito et al. | |
| 8,361,344 B2 | * | 1/2013 | Yanai ................. | C09K 19/3001 252/299.01 |
| 2009/0278089 A1 | | 11/2009 | Saito et al. | |
| 2011/0037912 A1 | | 2/2011 | Saito et al. | |
| 2011/0097519 A1 | | 4/2011 | Yanai et al. | |
| 2011/0272630 A1 | | 11/2011 | Shimada et al. | |
| 2015/0284637 A1 | * | 10/2015 | Furusato ............ | C09K 19/3402 252/299.61 |

FOREIGN PATENT DOCUMENTS

| | | | |
|---|---|---|---|
| CN | 101698802 A | 4/2010 | |
| CN | 102307838 A | 1/2012 | |
| CN | 102344815 A | 2/2012 | |
| CN | 103361076 | * 10/2013 | ............ C09K 19/44 |
| CN | 103361076 A | 10/2013 | |
| CN | 104419427 A | 3/2015 | |
| CN | 104449764 A | 3/2015 | |
| JP | 2009-270026 A | 11/2009 | |
| JP | 2010-270074 A | 12/2010 | |
| JP | 2011-89082 A | 5/2011 | |
| JP | 2012-97222 A | 5/2012 | |

* cited by examiner

*Primary Examiner* — Geraldina Visconti
(74) *Attorney, Agent, or Firm* — Hoffmann & Baron, LLP

(57) ABSTRACT

Provided is a liquid crystal composition, which comprises a component prepared from one or more compounds selected from a general formula I; and a component prepared from one or more compounds selected from a general formula II. The liquid crystal composition has the characteristics of low viscosity, high reliability, appropriate optical anisotropy, and appropriate dielectric anisotropy, and is applicable to liquid crystal display devices.

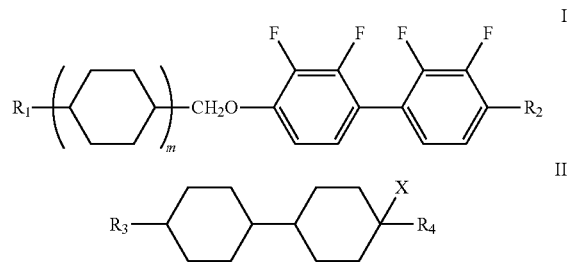

9 Claims, No Drawings

LIQUID CRYSTAL COMPOSITION AND DISPLAY DEVICE THEREOF

CROSS-REFERENCE TO RELATED APPLICATIONS

This application is the National Stage of International Application No. PCT/CN2016/106007, filed Nov. 16, 2016, which claims the benefit of Chinese Application No. CN 201510808198.0, filed Nov. 19, 2015, the contents of which is incorporated by reference herein.

TECHNICAL FIELD

The present invention relates to liquid crystal composition having low viscosity, high reliability, appropriate optical anisotropy and appropriate dielectric anisotropy, and liquid crystal display device comprising the same.

BACKGROUND ARTS

Liquid crystal display devices are used in many fields for information display and can be used as direct-view displays or as projection-type displays.

Based on displaying mode, they can be classified as PC (phase change), TN (twisted nematic), STN (super twisted nematic), ECB (electrically controlled birefringence), OCB (optically compensated bend), IPS (in-plane switching), VA (vertical alignment) and so forth.

Liquid crystal having positive dielectric anisotropy can be used in the device in TN mode or STN mode. Liquid crystal having negative dielectric anisotropy can be used in the device in VA mode. As for IPS/FFS mode, both liquid crystal having positive dielectric anisotropy and liquid crystal having negative dielectric anisotropy can be used. Among others, IPS mode has good viewing angle characteristic and improved response time, and is increasingly used in multimedia applications, e.g., mobile phones, tablet computers, as well as TVs and desktop monitors.

The contrast ratio of liquid crystal display device will increase if liquid crystal material having appropriate optical anisotropy is comprised. The requirements for optical anisotropy are various among different liquid crystal display modes, and a wider viewing angle can be obtained by a smaller optical anisotropy.

The response time of liquid crystal display device will shorten if liquid crystal material having low viscosity is comprised. When the response time of a liquid crystal display device is short, the device is suitable for animation display.

Liquid crystal material having a large dielectric anisotropy can have a reduced threshold voltage and thereby a reduced electric power consumption. However, the larger the dielectric anisotropy is, the easier the material is to be destroyed by light, heat or electric, resulting in ion release, and then a reduction of resistivity.

The voltage holding ratio and the contrast ratio of liquid crystal display device will increase, if liquid crystal material having large resistivity is comprised. Therefore, liquid crystal materials are required to have a large resistivity value both at early stage of using and even after being used for a long time.

From the perspective of the preparation of liquid crystal materials, the performances of liquid crystal materials are restricted and influenced by each other.

And the improvement of one performance index may cause some changes of other performances. Therefore, creative works are often required to prepare liquid crystal materials with suitable properties in various aspects.

Therefore, in order to obtain a stable liquid crystal display state and meet the above requirements, it is the direction of the efforts of those skilled in the art to provide liquid crystal materials having low viscosity, high reliability, appropriate optical anisotropy and appropriate dielectric anisotropy by optimizing liquid crystal materials.

The object of the present invention is to provide a liquid crystal composition having low viscosity, high reliability and appropriate optical anisotropy.

SUMMARY OF THE INVENTION

Objects of the present invention: The object of the present invention is to provide a liquid crystal composition having low viscosity, high reliability and appropriate optical anisotropy.

Another object of the present invention is to provide a liquid crystal display device, which comprises a liquid crystal composition having low viscosity, high reliability and appropriate optical anisotropy.

Technical solutions: In order to achieve the aforementioned objects of the present invention, the present invention provides a liquid crystal composition which comprises:

one or more compounds selected from a group consisting of compounds of general formula I

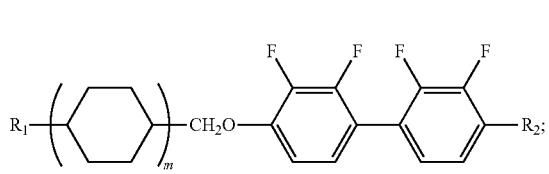

and one or more compounds selected from a group consisting of compounds of general formula II

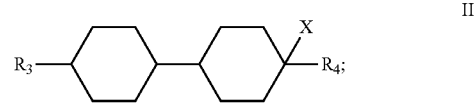

in which:

$R_1$ and $R_2$ are same or different, and each independently represents $C_1$-$C_7$ linear alkyl, $C_1$-$C_7$ linear alkoxy;

$R_3$ and $R_4$ are same or different, and each independently represents $C_1$-$C_7$ linear alkyl;

X represents CN or $CF_3$;

m represents 1 or 2.

In embodiments of the present invention, the compound of general formula I is preferably selected from a group consisting of the following compounds:

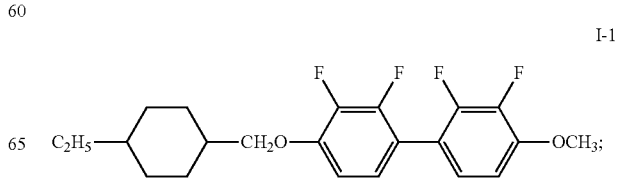

I-2
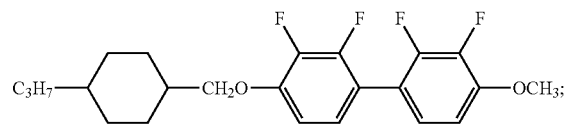
I-3
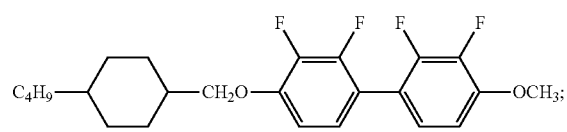
I-4
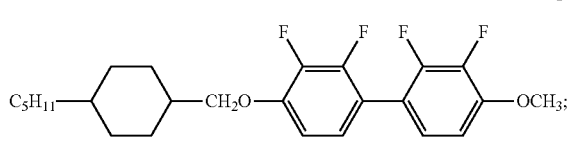
I-5
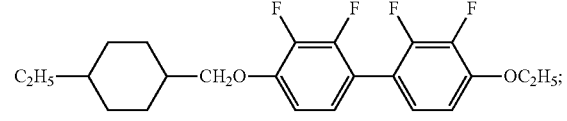
I-6
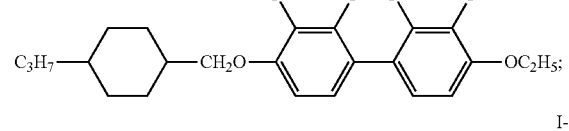
I-7
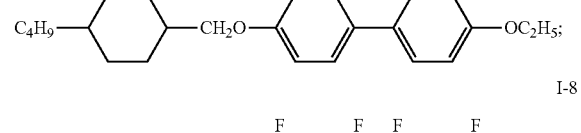
I-8
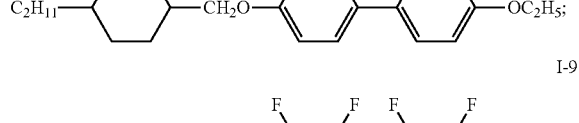
I-9
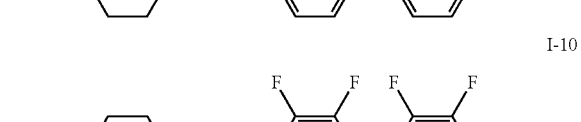
I-10
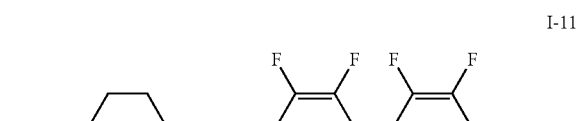
I-11
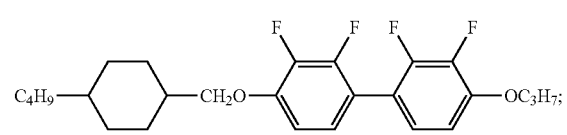
I-12
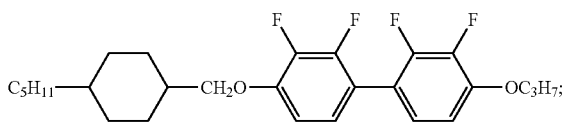
I-13
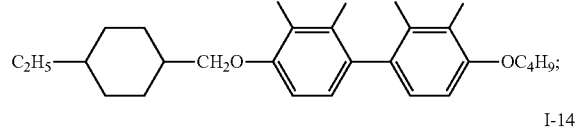
I-14
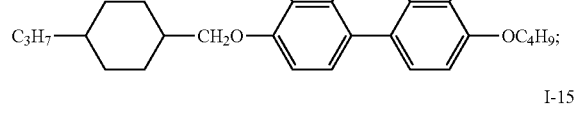
I-15
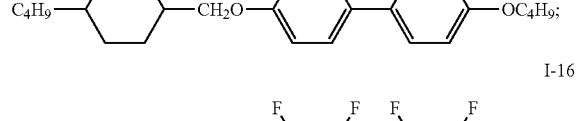
I-16
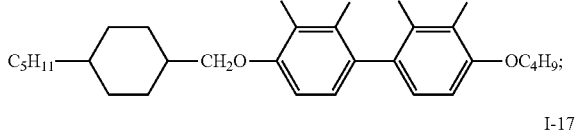
I-17
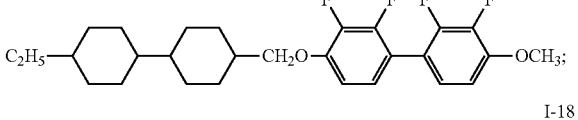
I-18
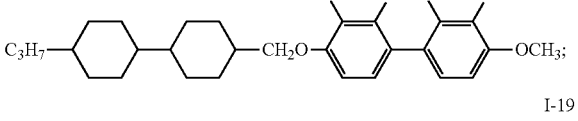
I-19
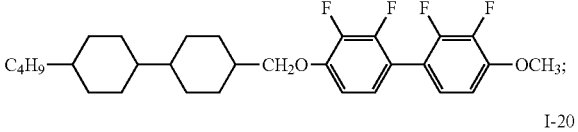
I-20
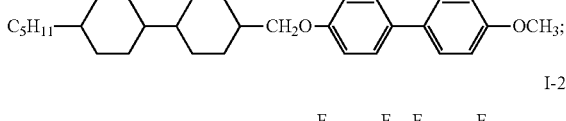
I-21
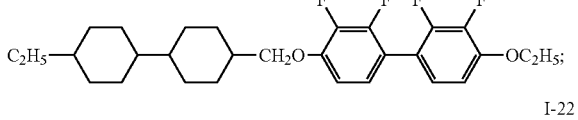
I-22
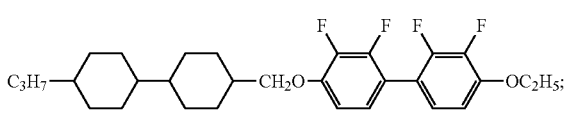

-continued

I-23: C₄H₉—[Cy]—[Cy]—CH₂O—[Ph(F,F)]—[Ph(F,F)]—OC₂H₅;

I-24: C₅H₁₁—[Cy]—[Cy]—CH₂O—[Ph(F,F)]—[Ph(F,F)]—OC₂H₅;

I-25: C₂H₅—[Cy]—[Cy]—CH₂O—[Ph(F,F)]—[Ph(F,F)]—OC₃H₇;

I-26: C₃H₇—[Cy]—[Cy]—CH₂O—[Ph(F,F)]—[Ph(F,F)]—OC₃H₇;

I-27: C₄H₉—[Cy]—[Cy]—CH₂O—[Ph(F,F)]—[Ph(F,F)]—OC₃H₇;

I-28: C₅H₁₁—[Cy]—[Cy]—CH₂O—[Ph(F,F)]—[Ph(F,F)]—OC₃H₇;

I-29: C₂H₅—[Cy]—[Cy]—CH₂O—[Ph(F,F)]—[Ph(F,F)]—OC₄H₉;

I-30: C₃H₇—[Cy]—[Cy]—CH₂O—[Ph(F,F)]—[Ph(F,F)]—OC₄H₉;

I-31: C₄H₉—[Cy]—[Cy]—CH₂O—[Ph(F,F)]—[Ph(F,F)]—OC₄H₉; and

I-32: C₅H₁₁—[Cy]—[Cy]—CH₂O—[Ph(F,F)]—[Ph(F,F)]—OC₄H₉, and the compound of general formula II is preferably selected from a group consisting of the following compounds:

II-1: C₂H₅—[Cy]—[Cy(CN)]—C₃H₇;

II-2: C₂H₅—[Cy]—[Cy(CN)]—C₄H₉;

II-3: C₂H₅—[Cy]—[Cy(CN)]—C₅H₁₁;

II-4: C₃H₇—[Cy]—[Cy(CN)]—C₃H₇;

II-5: C₃H₇—[Cy]—[Cy(CN)]—C₄H₉;

II-6: C₃H₇—[Cy]—[Cy(CN)]—C₅H₁₁;

II-7: C₃H₇—[Cy]—[Cy(CN)]—C₆H₁₃;

II-8: C₄H₉—[Cy]—[Cy(CN)]—C₃H₇;

II-9: C₄H₉—[Cy]—[Cy(CN)]—C₄H₉;

II-10: C₄H₉—[Cy]—[Cy(CN)]—C₅H₁₁;

II-11: C₄H₉—[Cy]—[Cy(CN)]—C₆H₁₃;

II-12: C₅H₁₁—[Cy]—[Cy(CN)]—C₃H₇;

II-13: C₅H₁₁—[Cy]—[Cy(CN)]—C₄H₉;

II-14: C₅H₁₁—[Cy]—[Cy(CN)]—C₅H₁₁;

II-15: C₅H₁₁—[Cy]—[Cy(CN)]—C₆H₁₃;

II-16: C₂H₅—[Cy]—[Cy(CF₃)]—C₃H₇;

-continued

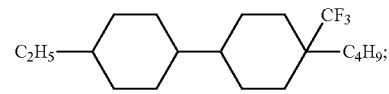 II-17

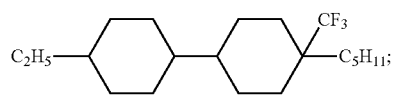 II-18

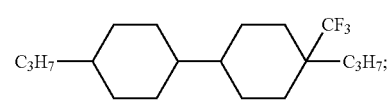 II-19

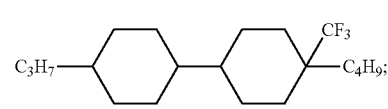 II-20

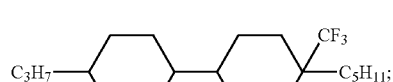 II-21

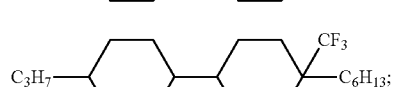 II-22

 II-23

 II-24

 II-25

 II-26

 II-27

 II-28

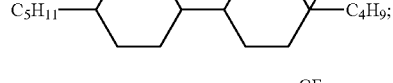 II-29

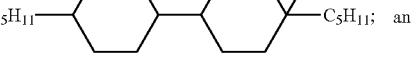 II-30

In embodiments of the present invention, the liquid crystal composition further comprises one or more compounds selected from a group consisting of compounds of general formula III

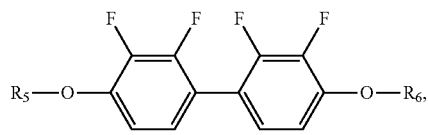 III in which, $R_5$ and $R_6$ are same or different, and each independently represents $C_1$-$C_{10}$ linear alkyl.

In embodiments of the present invention, the compound of general formula III is preferably selected from a group consisting of the following compounds:

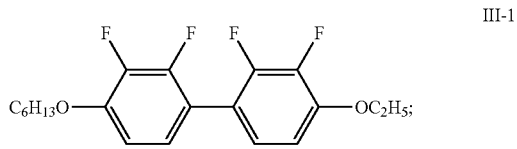 III-1

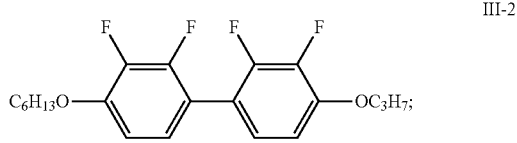 III-2

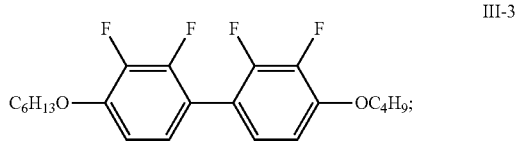 III-3

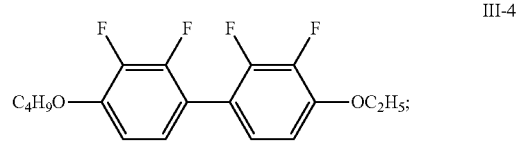 III-4

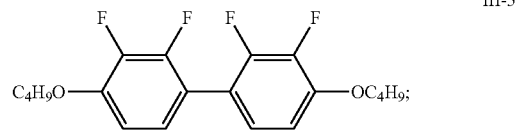 III-5

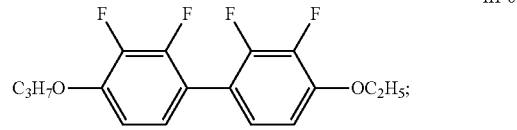 III-6

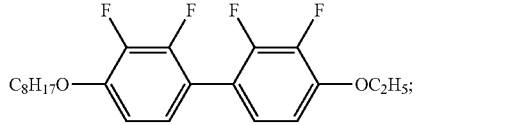 III-7

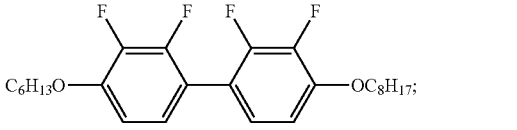 III-8

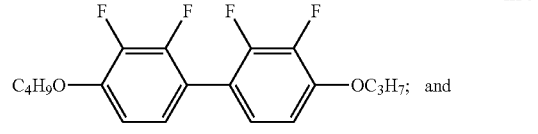 III-9

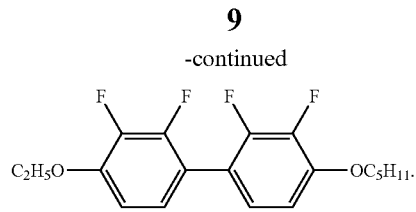
III-10

In embodiments of the present invention, the liquid crystal composition further comprises one or more compounds of general formulas IV and/or V

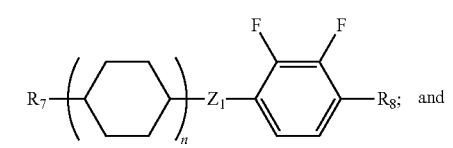
IV

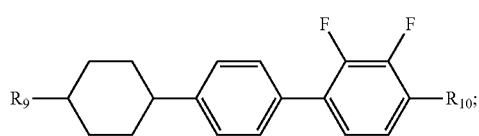
V in which, $R_7$, $R_8$, $R_9$ and $R_{10}$ are same or different, and each independently represents $C_1$-$C_7$ linear alkyl, $C_1$-$C_7$ linear alkoxy;

$Z_1$ represents a single bond, —CH$_2$O— or —COO—;

n represents 1 or 2.

In embodiments of the present invention, the compound of general formula IV is preferably selected from a group consisting of the following compounds:

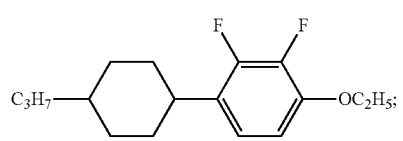
IV-1

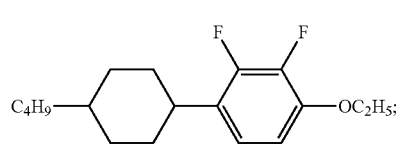
IV-2

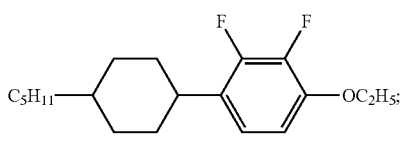
IV-3

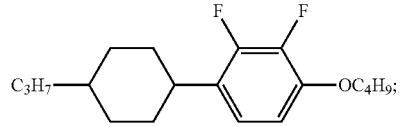
IV-4

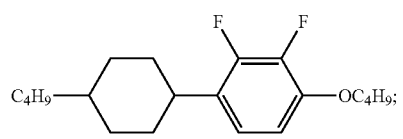
IV-5

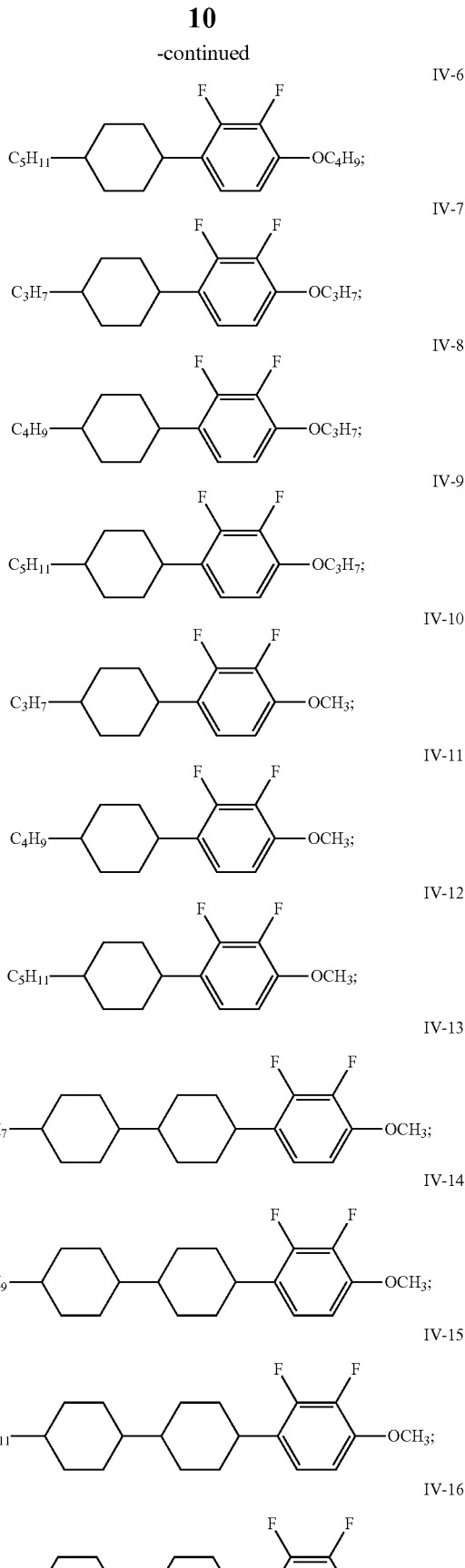

IV-17: C4H9–Cy–Cy–Ph(2,3-F2)–OC2H5;

IV-18: C5H11–Cy–Cy–Ph(2,3-F2)–OC2H5;

IV-19: C3H7–Cy–Cy–Ph(2,3-F2)–OC3H7;

IV-20: C4H9–Cy–Cy–Ph(2,3-F2)–OC3H7;

IV-21: C5H11–Cy–Cy–Ph(2,3-F2)–OC3H7;

IV-22: C3H7–Cy–Cy–Ph(2,3-F2)–OC4H9;

IV-23: C4H9–Cy–Cy–Ph(2,3-F2)–OC4H9;

IV-24: C5H11–Cy–Cy–Ph(2,3-F2)–OC4H9;

IV-25: C2H5–Cy–CH2O–Ph(2,3-F2)–OCH3;

IV-26: C3H7–Cy–CH2O–Ph(2,3-F2)–OCH3;

IV-27: C4H9–Cy–CH2O–Ph(2,3-F2)–OCH3;

IV-28: C5H11–Cy–CH2O–Ph(2,3-F2)–OCH3;

IV-29: C2H5–Cy–CH2O–Ph(2,3-F2)–OC2H5;

IV-30: C3H7–Cy–CH2O–Ph(2,3-F2)–OC2H5;

IV-31: C4H9–Cy–CH2O–Ph(2,3-F2)–OC2H5;

IV-32: C5H11–Cy–CH2O–Ph(2,3-F2)–OC2H5;

IV-33: C2H5–Cy–CH2O–Ph(2,3-F2)–OC3H7;

IV-34: C3H7–Cy–CH2O–Ph(2,3-F2)–OC3H7;

IV-35: C4H9–Cy–CH2O–Ph(2,3-F2)–OC3H7;

IV-36: C5H11–Cy–CH2O–Ph(2,3-F2)–OC3H7;

IV-37: C2H5–Cy–Cy–CH2O–Ph(2,3-F2)–OCH3;

IV-38
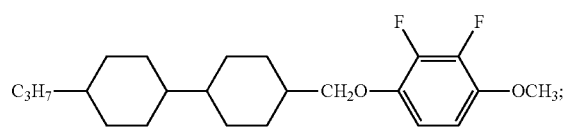
IV-39
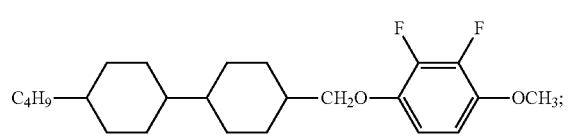
IV-40
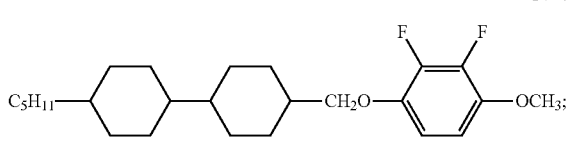
IV-41
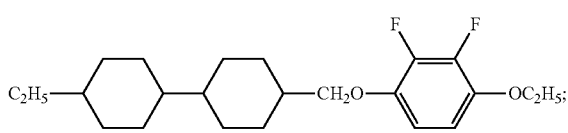
IV-42
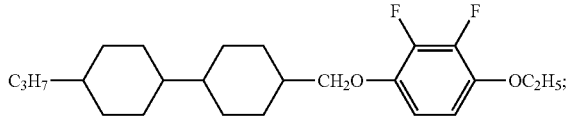
IF-43
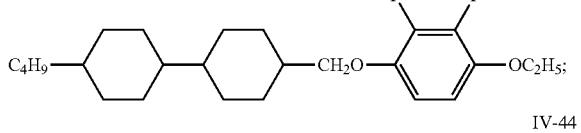
IV-44
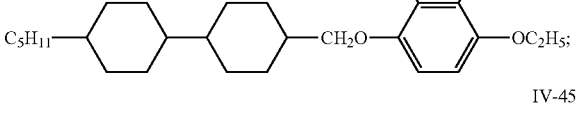
IV-45
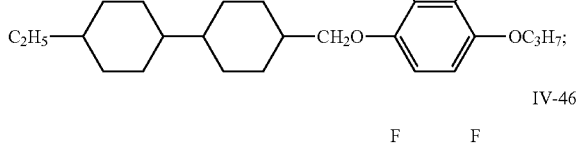
IV-46
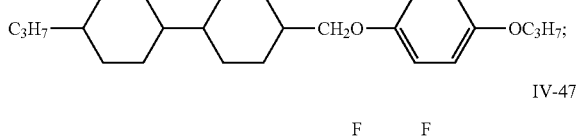
IV-47
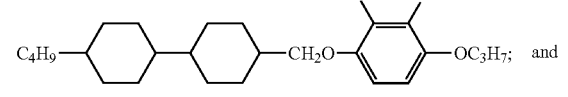
and
IV-48
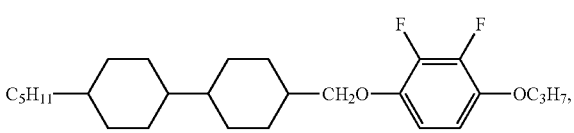
and the compound of general formula V is preferably selected from a group consisting of the following compounds:
V-1
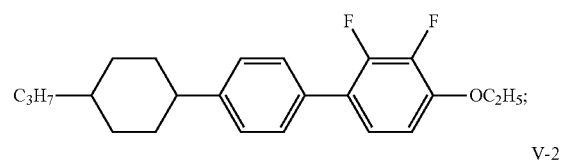
V-2
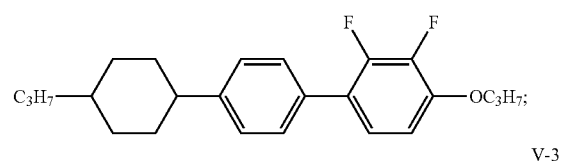
V-3
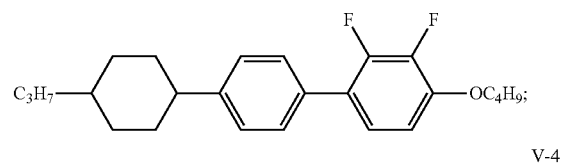
V-4
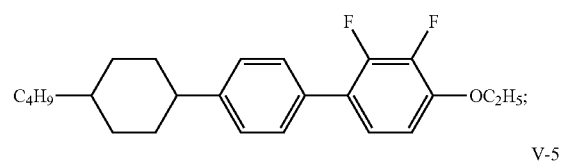
V-5
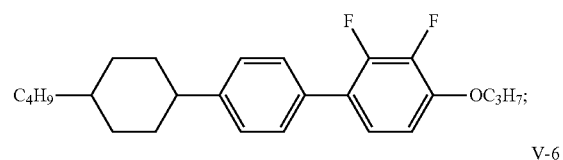
V-6
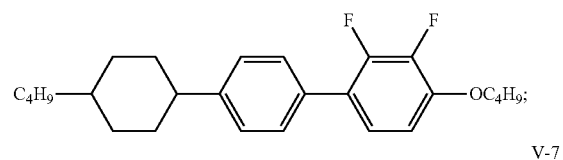
V-7
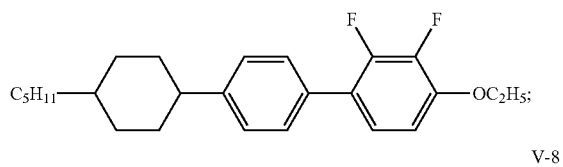
V-8
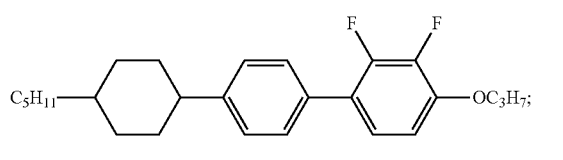

-continued

V-9
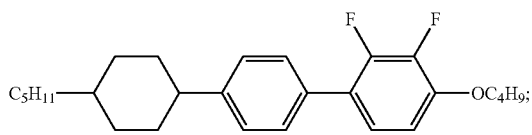

V-10
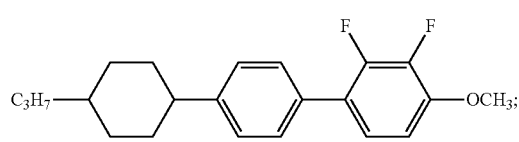

V-11
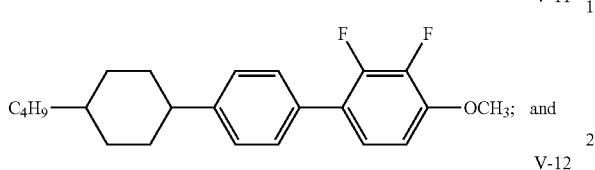

V-12
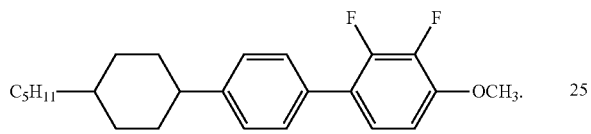

In embodiments of the present invention, the liquid crystal composition further comprises one or more compounds of general formula VI VI
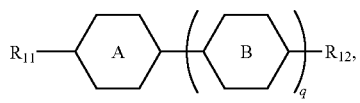

in which, $R_{11}$ and $R_{12}$ are same or different, and each independently represents $C_1$-$C_7$ linear alkyl, $C_1$-$C_7$ linear alkoxy, $C_2$-$C_5$ linear alkenyl;

rings
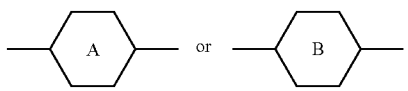

or are same or different, and each independently represents
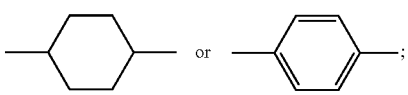

q represents 1 or 2;
when q represents 2, two rings
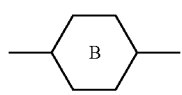

are same or different, and each independently represents or
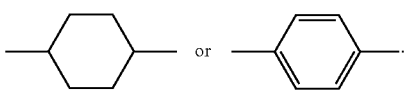

In embodiments of the present invention, the compound of general formula VI is preferably selected from a group consisting of the following compounds:

VI-1
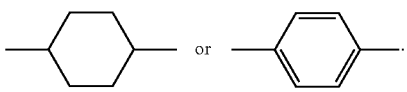

VI-2
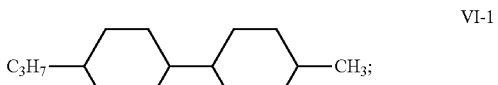

VI-3
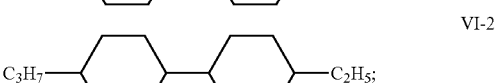

VI-4
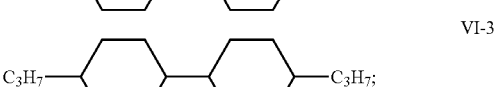

VI-5
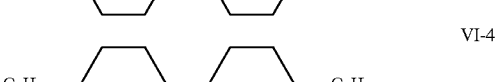

VI-6

VI-7
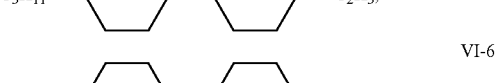

VI-8
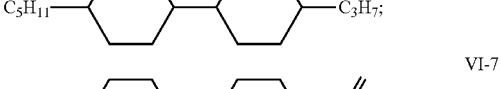

VI-9
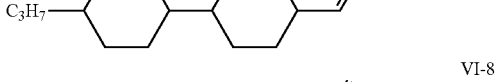

VI-10
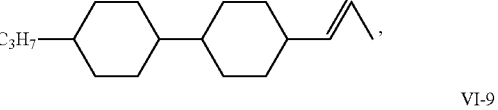

VI-11
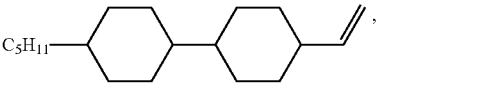

VI-12
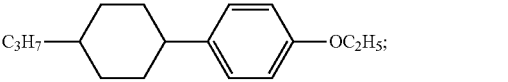

VI-13
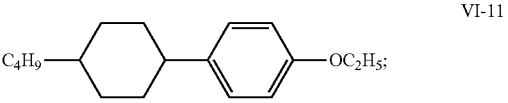

VI-14 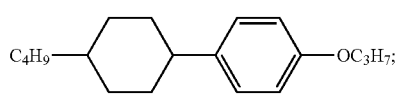
VI-15 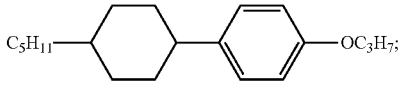
VI-16 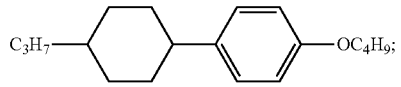
VI-17 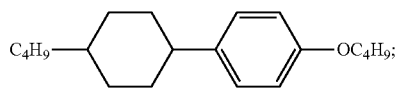
VI-18 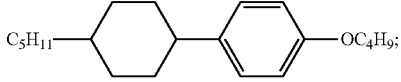
VI-19 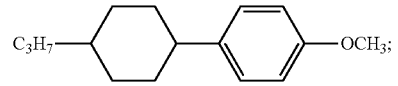
VI-20 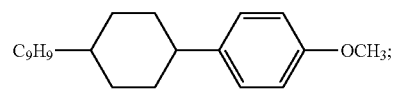
VI-21 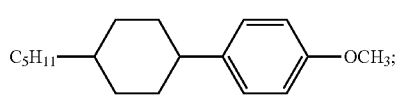
VI-22 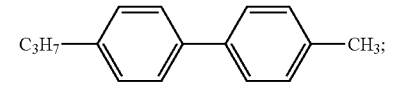
VI-23 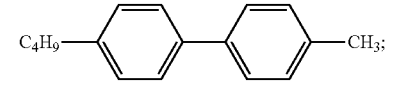
VI-24 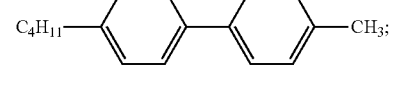
VI-25 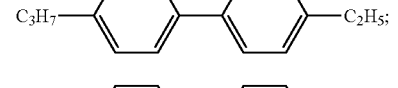
VI-26 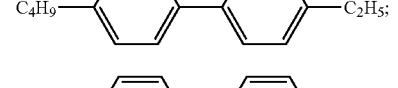
VI-27 
VI-28 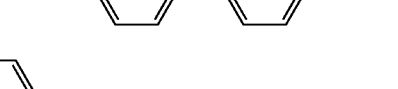
VI-29 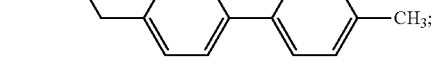
VI-30 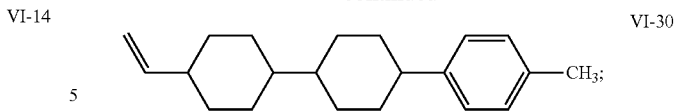
VI-31 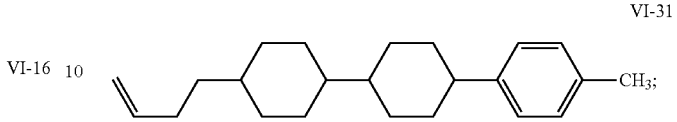
VI-32 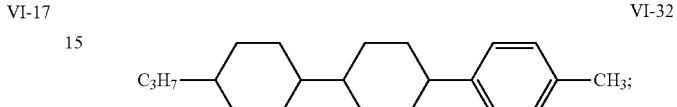
VI-33 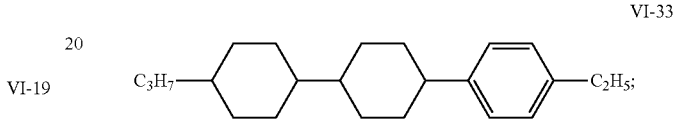
VI-34 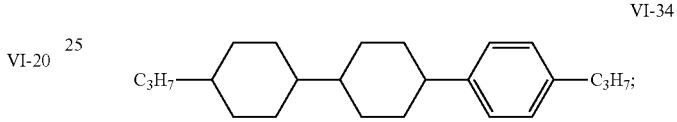
VI-35 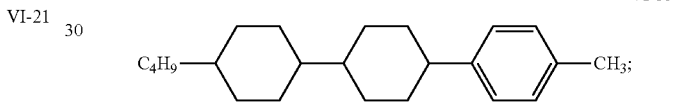
VI-36 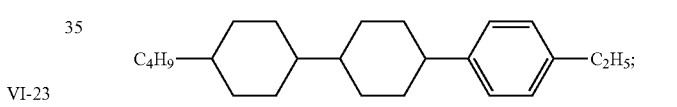
VI-37 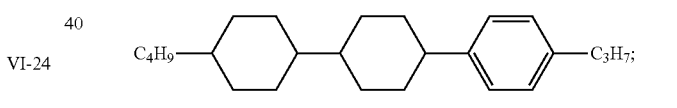
VI-38 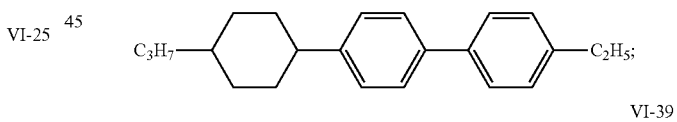
VI-39 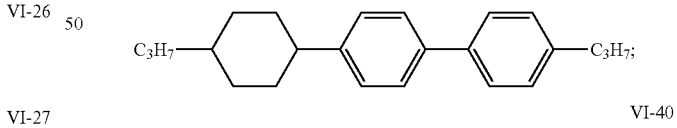
VI-40 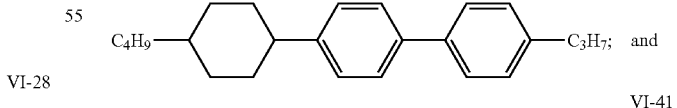
VI-41 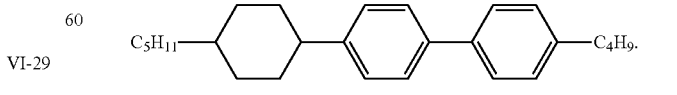
In embodiments of the present invention, the liquid crystal composition further comprises one or more compounds of general formula VII

VII

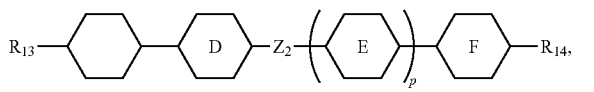

in which, $R_{13}$ and $R_{14}$ are same or different, and each independently represents $C_1$-$C_7$ linear alkyl, $C_1$-$C_7$ linear alkoxy;

rings

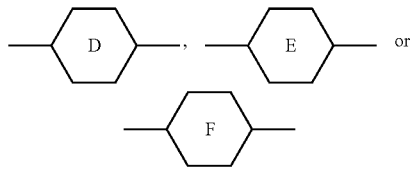

are same or different, and each independently represents

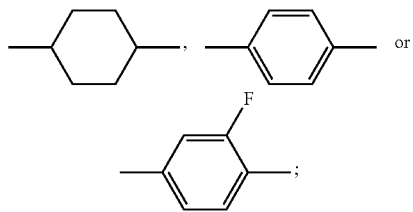

$Z_2$ represents a single bond, —$CH_2O$— or —COO—;

p represents 0 or 1;

when $Z_2$ represents a single bond, p represents 1.

In embodiments of the present invention, the compound of general formula VII is preferably selected from a group consisting of the following compounds:

VII-1
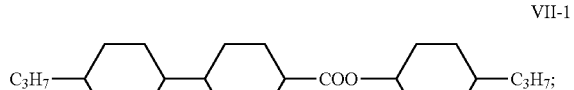

VII-2
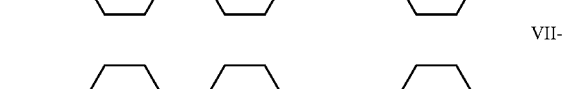

VII-3
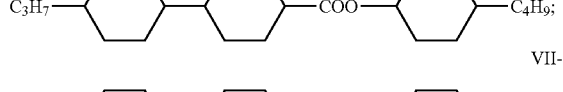

VII-4
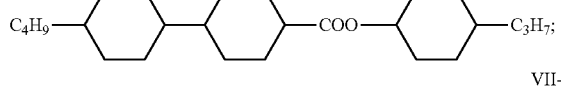

VII-5
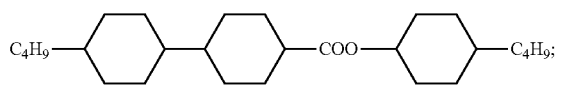

VII-6
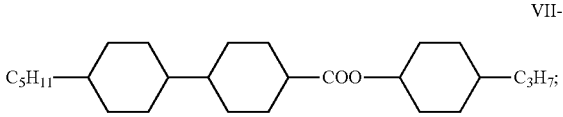

VII-7
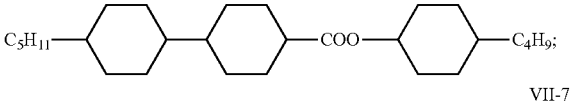

VII-8
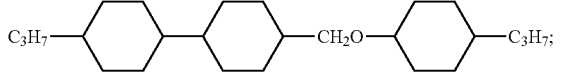

VII-9
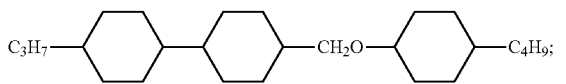

VII-10
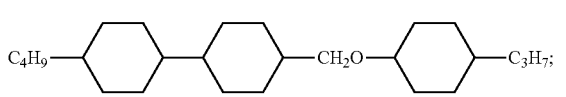

VII-11
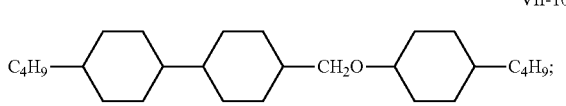

VII-12
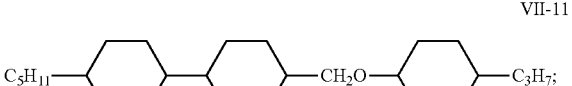

VII-13
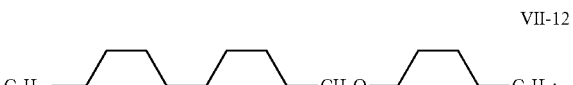

VII-14
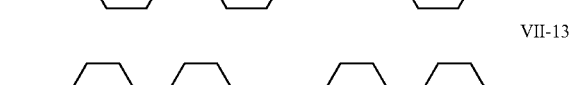

VII-15
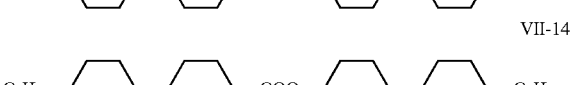

VII-16

VII-17
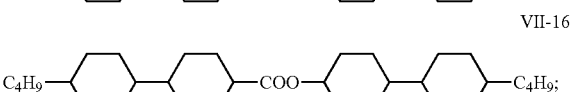

VII-18
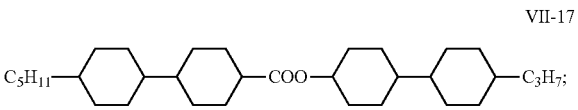

VII-19
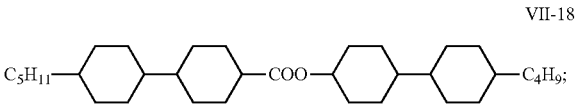

VII-20
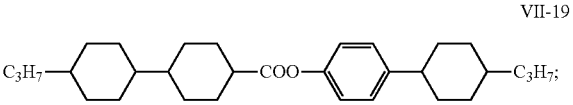

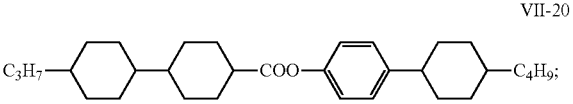

VII-21
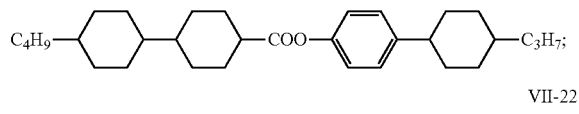
VII-22
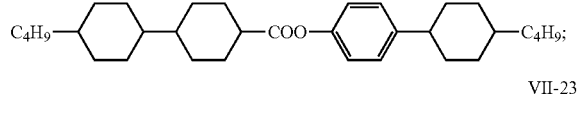
VII-23
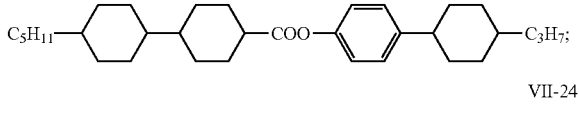
VII-24
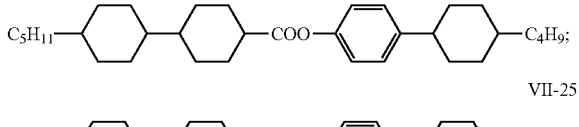
VII-25
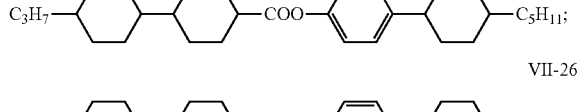
VII-26
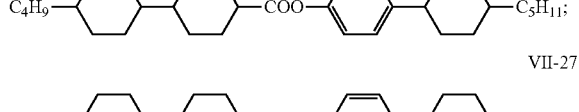
VII-27
VII-28
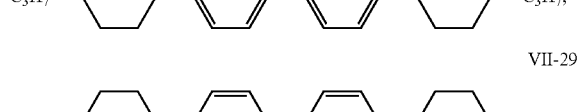
VII-29
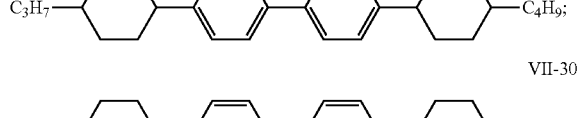
VII-30
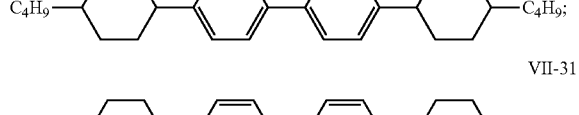
VII-31
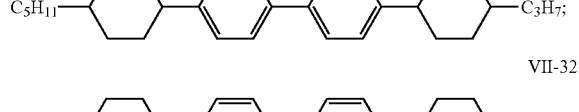
VII-32
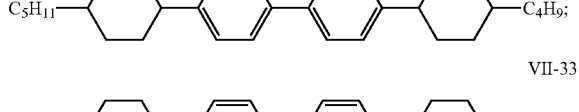
VII-33
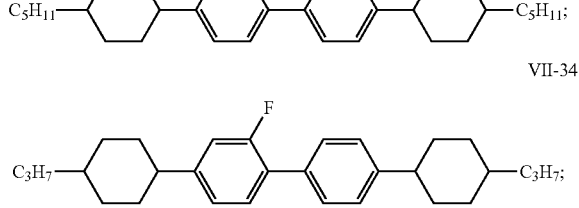
VII-34
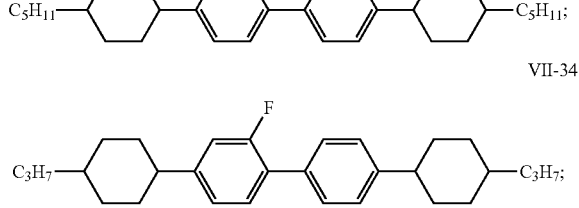
VII-35
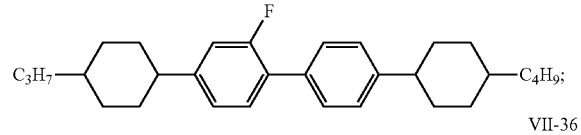
VII-36
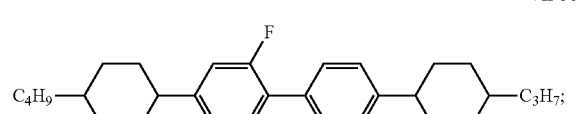
VII-37
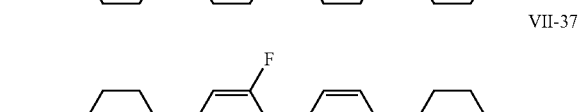
VII-38
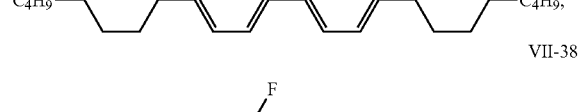
VII-39
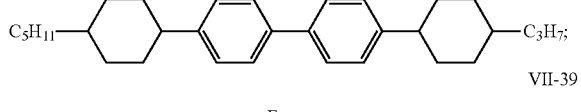
VII-40
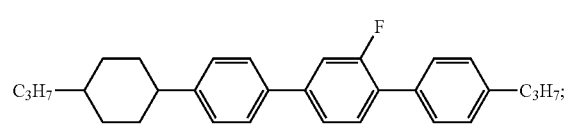
VII-41
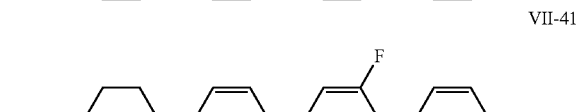
VII-42
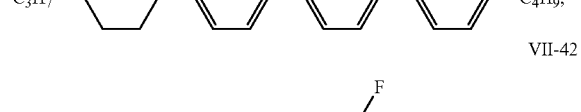
VII-43
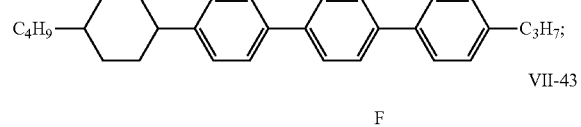
VII-44
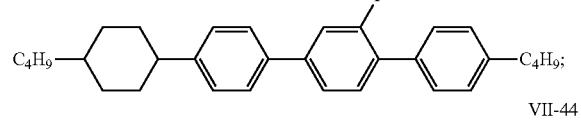 and
VII-45
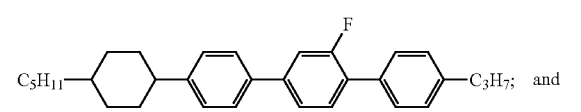
As a preferred solution, in the liquid crystal composition of the present invention, the weight percentage of the group consisting of compounds of general formula I is 1-30%; the weight percentage of the group consisting of compounds of general formula II is 1-40%; the weight percentage of the group consisting of compounds of general formula III is 0-10%; the weight percentage of the group consisting of compounds of general formulas IV and/or V is 30-75%; the weight percentage of the group consisting of compounds of general formula VI is 0-30%; the weight percentage of the group consisting of compounds of general formula VII is 0-10%.

As a preferred solution, in the liquid crystal composition of the present invention, the weight percentage of the group consisting of compounds of general formula I is 6-27%; the weight percentage of the group consisting of compounds of general formula II is 5-39%; the weight percentage of the group consisting of compounds of general formula III is 0-6%; the weight percentage of the group consisting of compounds of general formulas IV and/or V is 30-70%; the weight percentage of the group consisting of compounds of general formula VI is 0-29%; the weight percentage of the group consisting of compounds of general formula VII is 0-6%.

As a preferred solution, in the liquid crystal composition of the present invention, the weight percentage of the group consisting of compounds of general formula I is 6-27%; the weight percentage of the group consisting of compounds of general formula II is 5-39%; the weight percentage of the group consisting of compounds of general formula III is 1-6%; the weight percentage of the group consisting of compounds of general formulas IV is 27-66%; the weight percentage of the group consisting of compounds of general formulas V is 0-12%; the weight percentage of the group consisting of compounds of general formula VI is 1-29%; the weight percentage of the group consisting of compounds of general formula VII is 1-6%.

As a preferred solution, as for the aforementioned liquid crystal compositions, the liquid crystal composition comprises:

7% by weight of the total amount of the liquid crystal composition of compound IV-27;

8% by weight of the total amount of the liquid crystal composition of compound IV-26;

8% by weight of the total amount of the liquid crystal composition of compound IV-33;

10% by weight of the total amount of the liquid crystal composition of compound IV-34;

6% by weight of the total amount of the liquid crystal composition of compound IV-38;

10% by weight of the total amount of the liquid crystal composition of compound IV-35;

6% by weight of the total amount of the liquid crystal composition of compound 1-6;

6% by weight of the total amount of the liquid crystal composition of compound 1-7;

5% by weight of the total amount of the liquid crystal composition of compound 1-8;

10% by weight of the total amount of the liquid crystal composition of compound II-5;

12% by weight of the total amount of the liquid crystal composition of compound II-7; and 12% by weight of the total amount of the liquid crystal composition of compound II-6, or, the liquid crystal composition comprises:

5% by weight of the total amount of the liquid crystal composition of compound IV-16;

9% by weight of the total amount of the liquid crystal composition of compound IV-26;

9% by weight of the total amount of the liquid crystal composition of compound IV-27;

8% by weight of the total amount of the liquid crystal composition of compound IV-28;

7% by weight of the total amount of the liquid crystal composition of compound IV-33;

7% by weight of the total amount of the liquid crystal composition of compound IV-34;

4% by weight of the total amount of the liquid crystal composition of compound IV-38;

7% by weight of the total amount of the liquid crystal composition of compound IV-35;

5% by weight of the total amount of the liquid crystal composition of compound IV-36;

5% by weight of the total amount of the liquid crystal composition of compound I-6;

5% by weight of the total amount of the liquid crystal composition of compound I-7;

5% by weight of the total amount of the liquid crystal composition of compound I-8;

6% by weight of the total amount of the liquid crystal composition of compound II-5;

9% by weight of the total amount of the liquid crystal composition of compound II-7; and 9% by weight of the total amount of the liquid crystal composition of compound 11-6, or, the liquid crystal composition comprises:

3% by weight of the total amount of the liquid crystal composition of compound VII-28;

3% by weight of the total amount of the liquid crystal composition of compound VII-31;

6% by weight of the total amount of the liquid crystal composition of compound II-5;

6% by weight of the total amount of the liquid crystal composition of compound II-7;

6% by weight of the total amount of the liquid crystal composition of compound II-6;

17% by weight of the total amount of the liquid crystal composition of compound VI-5;

5% by weight of the total amount of the liquid crystal composition of compound VI-8;

7% by weight of the total amount of the liquid crystal composition of compound VI-21;

4% by weight of the total amount of the liquid crystal composition of compound IV-26;

8% by weight of the total amount of the liquid crystal composition of compound IV-34;

8% by weight of the total amount of the liquid crystal composition of compound IV-35;

7% by weight of the total amount of the liquid crystal composition of compound IV-27;

6% by weight of the total amount of the liquid crystal composition of compound III-1;

8% by weight of the total amount of the liquid crystal composition of compound V-1;

3% by weight of the total amount of the liquid crystal composition of compound 1-6; and 3% by weight of the total amount of the liquid crystal composition of compound I-7, or, the liquid crystal composition comprises:

4% by weight of the total amount of the liquid crystal composition of compound VII-20;

4% by weight of the total amount of the liquid crystal composition of compound VII-19;

3% by weight of the total amount of the liquid crystal composition of compound VII-1;

3% by weight of the total amount of the liquid crystal composition of compound VII-15;
10% by weight of the total amount of the liquid crystal composition of compound VI-4;
4% by weight of the total amount of the liquid crystal composition of compound IV-1;
10% by weight of the total amount of the liquid crystal composition of compound IV-3;
14% by weight of the total amount of the liquid crystal composition of compound IV-4;
9% by weight of the total amount of the liquid crystal composition of compound IV-6;
6% by weight of the total amount of the liquid crystal composition of compound IV-16;
6% by weight of the total amount of the liquid crystal composition of compound IV-18;
6% by weight of the total amount of the liquid crystal composition of compound IV-17;
6% by weight of the total amount of the liquid crystal composition of compound IV-19;
7% by weight of the total amount of the liquid crystal composition of compound II-21;
5% by weight of the total amount of the liquid crystal composition of compound I-6; and
3% by weight of the total amount of the liquid crystal composition of compound I-7,
or, the liquid crystal composition comprises:
5% by weight of the total amount of the liquid crystal composition of compound IV-26;
7% by weight of the total amount of the liquid crystal composition of compound IV-33;
8% by weight of the total amount of the liquid crystal composition of compound IV-34;
5% by weight of the total amount of the liquid crystal composition of compound IV-38;
8% by weight of the total amount of the liquid crystal composition of compound IV-35;
6% by weight of the total amount of the liquid crystal composition of compound IV-36;
5% by weight of the total amount of the liquid crystal composition of compound 1-6;
5% by weight of the total amount of the liquid crystal composition of compound 1-7;
5% by weight of the total amount of the liquid crystal composition of compound 1-8;
7% by weight of the total amount of the liquid crystal composition of compound III-1;
11% by weight of the total amount of the liquid crystal composition of compound II-5;
14% by weight of the total amount of the liquid crystal composition of compound II-6; and
14% by weight of the total amount of the liquid crystal composition of compound II-6,
or, the liquid crystal composition comprises:
5% by weight of the total amount of the liquid crystal composition of compound V-1;
4% by weight of the total amount of the liquid crystal composition of compound V-3;
3% by weight of the total amount of the liquid crystal composition of compound V-2;
5% by weight of the total amount of the liquid crystal composition of compound IV-16;
8% by weight of the total amount of the liquid crystal composition of compound IV-26;
5% by weight of the total amount of the liquid crystal composition of compound IV-25;
5% by weight of the total amount of the liquid crystal composition of compound IV-27;
5% by weight of the total amount of the liquid crystal composition of compound IV-28;
7% by weight of the total amount of the liquid crystal composition of compound IV-33;
9% by weight of the total amount of the liquid crystal composition of compound IV-34;
6% by weight of the total amount of the liquid crystal composition of compound IV-38;
6% by weight of the total amount of the liquid crystal composition of compound IV-35;
9% by weight of the total amount of the liquid crystal composition of compound I-6;
9% by weight of the total amount of the liquid crystal composition of compound I-7;
9% by weight of the total amount of the liquid crystal composition of compound I-8; and
5% by weight of the total amount of the liquid crystal composition of compound 11-6,
or, the liquid crystal composition comprises:
5% by weight of the total amount of the liquid crystal composition of compound IV-16;
8% by weight of the total amount of the liquid crystal composition of compound IV-26;
7% by weight of the total amount of the liquid crystal composition of compound IV-25;
8% by weight of the total amount of the liquid crystal composition of compound IV-27;
8% by weight of the total amount of the liquid crystal composition of compound IV-28;
7% by weight of the total amount of the liquid crystal composition of compound IV-33;
7% by weight of the total amount of the liquid crystal composition of compound IV-34;
4% by weight of the total amount of the liquid crystal composition of compound IV-38;
7% by weight of the total amount of the liquid crystal composition of compound IV-35;
5% by weight of the total amount of the liquid crystal composition of compound IV-36;
5% by weight of the total amount of the liquid crystal composition of compound 1-6;
4% by weight of the total amount of the liquid crystal composition of compound 1-7;
6% by weight of the total amount of the liquid crystal composition of compound 1-22;
5% by weight of the total amount of the liquid crystal composition of compound II-5;
7% by weight of the total amount of the liquid crystal composition of compound II-7; and
7% by weight of the total amount of the liquid crystal composition of compound 11-6.

Another aspect of the present invention is to provide a liquid crystal display device, which comprises a liquid crystal composition having low viscosity, high reliability, appropriate optical anisotropy and appropriate dielectric anisotropy.

Advantageous effects: The liquid crystal composition of the present invention is obtained through a large number of screening experiments. The liquid crystal composition of the present invention has characteristics of low viscosity, high reliability, appropriate optical anisotropy and appropriate dielectric anisotropy and so forth, and is suitable to be used in a liquid crystal display device.

Unless specifically indicated, in the present invention, all ratios are weight ratios; all temperatures are degree centigrade; and the test on the data of the response time uses a cell gap of 4 μm.

DETAILED EMBODIMENTS

The present invention will be illustrated by combining the detailed embodiments below. It should be noted that, the following examples are exemplary embodiments of the present invention, which are only used to illustrate the present invention, not to limit it. Other combinations and various modifications within the conception of the present invention are possible without departing from the subject matter and scope of the present invention.

For the convenience of the expression, the group structures of the liquid crystal compositions in the following Examples are represented by the codes listed in Table 1:

TABLE 1

The codes of the group structures of the liquid crystal compounds

| Unit structure of groups | Code | Name of the groups |
|---|---|---|
| 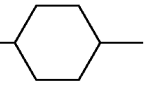 | C | 1,4-cyclohexylidene |
|  | P | 1,4-phenylene |
|  | G | 2-fluoro-1,4-phenylene |
|  | W | 2,3-difluoro-1,4-phenylene |
| 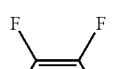 | P(2N) | 2,3-dicyano-1,4-phenylene |
| 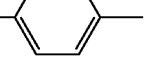 | C(N) | 4-cyano-1,4-cyclohexylidene |
| 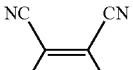 | C(CF3) | 4-trifluoromethyl-1,4-cyclohexylidene |
| —CN | —N | cyano |
| —CF$_3$ | —CF3 | trifluoromethyl |
| —F | F | fluorine |
| —O— | O | oxygen |
| —CH=CH— | V | ethenyl |
| —C$_n$H$_{2n+1}$ or —C$_m$H$_{2m+1}$ | n or m | alkyl |

Take a compound with the following structural formula as an example:

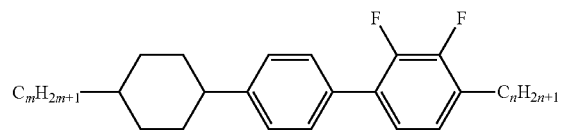

Represented by the codes listed in Table 1, this structural formula can be expressed as mCPWn, in which, the m in the code represents the number of the carbon atoms of the alkyl group on the left, for example, m is "2", meaning that the alkyl is —C$_2$H$_5$; the C in the code represents "cyclohexyl", the P in the code represents "1,4-phenylene", the W in the code represents "2,3-difluoro-1,4-phenylene", the n in the code represents the number of the carbon atoms of the alkyl group on the left, for example, n is "2", meaning that the alkyl is —C$_2$H$_5$.

The abbreviated codes of the test items in the following Examples are respectively represented as:

Cp: clearing point (nematic-isotropy phase transition temperature, ° C.)

Δn: optical anisotropy (589 nm, 20° C.)

Δε: dielectric anisotropy (1 KHz, 25° C.)

η flow viscosity (mPa*s, at 25° C.)

Is (initial) initial quiescent current (25° C., μA)

Is (UV) quiescent current after UV light irradiation (25° C., μA)

In which, the optical anisotropy is tested and obtained by using abbe refractometer under sodium lamp (589 nm) light source at 25° C.; Test conditions of V$_{10}$: DMS505/square wave/1 KHZ, VA test cell, and the cell gap is 4 μm;

Δε=ε|–ε⊥, in which, ε| is a dielectric constant parallel to molecular axis, ε⊥ is a dielectric constant perpendicular to molecular axis, with the test conditions: 25° C., 1 KHz, VA test cell, and the cell gap is 6 μm;

Is (initial) is the quiescent current of liquid crystals filled in the TN90 type test cell and tested under the test conditions of 25° C., 6 V, 40 Hz and square wave using SY-60A type electrical tester, the gap of the test cell is 7 μm, and the electrode area is 1 cm².

Is (UV) is the quiescent current of liquid crystals filled in the TN90 type test cell and tested after being subjected to the irradiation of a UV light with a wavelength of 365 nm and an energy of 450 mJ/cm², under the test conditions of 25° C., 6 V, 40 Hz and square wave using SY-60A type electrical tester, the gap of the test cell is 7 μm, and the electrode area is 1 cm².

The ingredients used in the following Examples can be synthesized by well-known methods or obtained by commercial means. These synthetic techniques are routine, and the test results show that the liquid crystal compounds thus prepared meet the criteria for the electronic compounds.

Several liquid crystal compositions are prepared according to the formulations of the liquid crystal compositions specified in the following Examples. The preparation of the liquid crystal compositions is proceeded according to the conventional methods in the art, and as an example, the compositions are prepared by mixing the specified formulation via the processing modes, such as heating, ultrasonic processing, suspending processing and so on.

The liquid crystal composition specified in the following Examples are prepared and studied. The formulas of the liquid crystal compositions and their test results for the performance are shown below.

Comparative Example 1

The liquid crystal composition of Comparative Example 1 is prepared according to each compound and weight percentage listed in Table 2 and is tested by filling the same between two substrates of a liquid crystal display device. The test data are shown in the Table below:

TABLE 2

The formulation of the liquid crystal composition and the test performances thereof

| Codes of the components | Codes of the structures | Content percentage | Test results for the performance parameters | |
|---|---|---|---|---|
| 2CEP(2N)O4 | | 9 | $\Delta n$ | 0.084 |
| 3CEP(2N)O4 | | 5 | $\Delta \varepsilon$ | −10.3 |
| 5CEP(2N)O4 | | 5 | Cp | 74 |
| 3CC(N)5 | | 13 | $\eta$ | 90 |
| 3CCV | | 5 | Is (initial) | 0.1 |
| 3CWO2 | | 8 | Is (UV) | 3.8 |
| 3CWO4 | | 7 | | |
| 5CWO4 | | 8 | | |
| 3CCWO2 | | 7 | | |
| 5CCWO2 | | 7 | | |
| 4CCWO2 | | 7 | | |
| 3CCWO3 | | 7 | | |
| 3CPWO2 | | 6 | | |
| 3CCWO2 | | 6 | | |
| Total | | 100 | | |

Example 1

The liquid crystal composition of Example 1 is prepared according to each compound and weight percentage listed in Table 3 and is tested by filling the same between two substrates of a liquid crystal display device. The test data are shown in the Table below:

TABLE 3

The formulation of the liquid crystal composition and the test performances thereof

| Codes of the components | Codes of the structures | Content percentage | Test results for the performance parameters | |
|---|---|---|---|---|
| 4C1OWO2 | IV-27 | 7 | $\Delta n$ | 0.0766 |
| 3C1OWO2 | IV-26 | 8 | $\Delta \varepsilon$ | −10.8 |
| 2CC1OWO2 | IV-33 | 8 | Cp | 81.6 |
| 3CC1OWO2 | IV-34 | 10 | $\eta$ | 54 |
| 3CC1OWO3 | IV-38 | 6 | Is (initial) | 0.03 |
| 4CC1OWO2 | IV-35 | 10 | Is (UV) | 0.05 |
| 3C1OWWO2 | I-6 | 6 | | |
| 4C1OWWO2 | I-7 | 6 | | |
| 5C1OWWO2 | I-8 | 5 | | |
| 3CC(N)4 | II-5 | 10 | | |
| 3CC(N)6 | II-7 | 12 | | |
| 3CC(N)5 | II6 | 12 | | |
| Total | | 100 | | |

As compared with Comparative Example 1, the Is (initial) and Is (UV) of this liquid crystal composition are smaller. Under same voltage condition, smaller current value means higher resistivity and better reliability of liquid crystal materials. In addition, this liquid crystal composition has lower viscosity, appropriately small optical anisotropy and appropriately large dielectric anisotropy and is suitable to be used in a liquid crystal display device.

Example 2

The liquid crystal composition of Example 2 is prepared according to each compound and weight percentage listed in Table 4 and is tested by filling the same between two substrates of a liquid crystal display device. The test data are shown in the Table below:

TABLE 4

The formulation of the liquid crystal composition and the test performances thereof

| Codes of the components | Codes of the structures | Content percentage | Test results for the performance parameters | |
|---|---|---|---|---|
| 3CCWO2 | IV-16 | 5 | $\Delta n$ | 0.0822 |
| 3C1OWO2 | IV-26 | 9 | $\Delta \varepsilon$ | −11.2 |
| 4C1OWO2 | IV-27 | 9 | Cp | 79.1 |
| 5C1OWO2 | IV-28 | 8 | $\eta$ | 56 |
| 2CC1OWO2 | IV-33 | 7 | Is (initial) | 0.04 |
| 3CC1OWO2 | IV-34 | 7 | Is (UV) | 0.06 |
| 3CC1OWO3 | IV-38 | 4 | | |
| 4CC1OWO2 | IV-35 | 7 | | |
| 5CC1OWO2 | IV-36 | 5 | | |
| 3C1OWWO2 | I-6 | 5 | | |
| 4C1OWWO2 | I-7 | 5 | | |
| 5C1OWWO2 | I-8 | 5 | | |
| 3CC(N)4 | II-5 | 6 | | |
| 3CC(N)6 | II-7 | 9 | | |
| 3CC(N)5 | II-6 | 9 | | |
| Total | | 100 | | |

As compared with Comparative Example 1, the Is (initial) and Is (UV) of this liquid crystal composition are smaller. Under same voltage condition, smaller current value means higher resistivity and better reliability of liquid crystal materials. In addition, this liquid crystal composition has lower viscosity, appropriate optical anisotropy and appropriately large dielectric anisotropy and is suitable to be used in a liquid crystal display device.

Example 3

The liquid crystal composition of Example 3 is prepared according to each compound and weight percentage listed in Table 5 and is tested by filling the same between two substrates of a liquid crystal display device. The test data are shown in the Table below:

TABLE 5

The formulation of the liquid crystal composition and the test performances thereof

| Codes of the components | Codes of the structures | Content percentage | Test results for the performance parameters | |
|---|---|---|---|---|
| 3CPPC3 | VII-28 | 3 | $\Delta n$ | 0.083 |
| 5CPPC3 | VII-31 | 3 | $\Delta \varepsilon$ | −5.1 |
| 3CC(N)4 | II-5 | 6 | Cp | 88 |
| 3CC(N)6 | II-7 | 6 | $\eta$ | 25 |
| 3CC(N)5 | II-6 | 6 | Is (initial) | 0.01 |
| 3CCV | VI-5 | 17 | Is (UV) | 0.01 |
| 3CPO2 | VI-8 | 5 | | |
| VCCP1 | VI-21 | 7 | | |
| 3CC1OWO2 | IV-26 | 4 | | |
| 3CC1OWO2 | IV-34 | 8 | | |
| 4CC1OWO2 | IV-35 | 8 | | |
| 4C1OWO2 | IV-27 | 7 | | |
| 6OWWO2 | III-1 | 6 | | |

TABLE 5-continued

The formulation of the liquid crystal composition
and the test performances thereof

| Codes of the components | Codes of the structures | Content percentage | Test results for the performance parameters | |
|---|---|---|---|---|
| 3CPWO2 | V-1 | 8 | | |
| 3C1OWWO2 | I-6 | 3 | | |
| 4C1OWWO2 | I-7 | 3 | | |
| Total | | 100 | | |

As compared with Comparative Example 1, the Is (initial) and Is (UV) of this liquid crystal composition are smaller. Under same voltage condition, smaller current value means higher resistivity and better reliability of liquid crystal materials. In addition, this liquid crystal composition has lower viscosity, appropriate optical anisotropy and appropriate dielectric anisotropy and is suitable to be used in a liquid crystal display device.

Example 4

The liquid crystal composition of Example 4 is prepared according to each compound and weight percentage listed in Table 6 and is tested by filling the same between two substrates of a liquid crystal display device. The test data are shown in the Table below:

TABLE 6

The formulation of the liquid crystal composition
and the test performances thereof

| Codes of the components | Codes of the structures | Content percentage | Test results for the performance parameters | |
|---|---|---|---|---|
| 3CCEPC4 | VII-20 | 4 | Δn | 0.084 |
| 3CCEPC3 | VII-19 | 4 | Δε | −5 |
| 3CCEC3 | VII-1 | 3 | Cp | 104 |
| 4CCECC3 | VII-15 | 3 | η | 36 |
| 5CC3 | VI-4 | 10 | Is (initial) | 0.01 |
| 3CWO2 | IV-1 | 4 | Is (UV) | 0.02 |
| 5CWO2 | IV-3 | 10 | | |
| 3CWO4 | IV-4 | 14 | | |
| 5CWO4 | IV-6 | 9 | | |
| 3CCWO2 | IV-16 | 6 | | |
| 5CCWO2 | IV-18 | 6 | | |
| 4CCWO2 | IV-17 | 6 | | |
| 3CCWO3 | IV-19 | 6 | | |
| 3CC (CF3) 5 | II-21 | 7 | | |
| 3C1OWWO2 | I-6 | 5 | | |
| 4C1OWWO2 | I-7 | 3 | | |
| Total | | 100 | | |

As compared with Comparative Example 1, the Is (initial) and Is (UV) of this liquid crystal composition are smaller. Under same voltage condition, smaller current value means higher resistivity and better reliability of liquid crystal materials. In addition, this liquid crystal composition has lower viscosity, appropriate optical anisotropy and appropriate dielectric anisotropy and is suitable to be used in a liquid crystal display device.

Example 5

The liquid crystal composition of Example 5 is prepared according to each compound and weight percentage listed in Table 7 and is tested by filling the same between two substrates of a liquid crystal display device. The test data are shown in the Table below:

TABLE 7

The formulation of the liquid crystal composition
and the test performances thereof

| Codes of the components | Codes of the structures | Content percentage | Test results for the performance parameters | |
|---|---|---|---|---|
| 3C1OWO2 | IV-26 | 5 | Δn | 0.078 |
| 2CC1OWO2 | IV-33 | 7 | Δε | −10.2 |
| 3CC1OWO2 | IV-34 | 8 | Cp | 81.2 |
| 3CC1OWO3 | IV-38 | 5 | η | 50 |
| 4CC1OWO2 | IV-35 | 8 | Is (initial) | 0.03 |
| 5CC1OWO2 | IV-36 | 6 | Is (UV) | 0.06 |
| 3C1OWWO2 | I-6 | 5 | | |
| 4C1OWWO2 | I-7 | 5 | | |
| 5C1OWWO2 | I-8 | 5 | | |
| 6OWWO2 | III-1 | 7 | | |
| 3CC(N)4 | II-5 | 11 | | |
| 3CC(N)6 | II-7 | 14 | | |
| 3CC(N)5 | II-6 | 14 | | |
| Total | | 100 | | |

As compared with Comparative Example 1, the Is (initial) and Is (UV) of this liquid crystal composition are smaller. Under same voltage condition, smaller current value means higher resistivity and better reliability of liquid crystal materials. In addition, this liquid crystal composition has lower viscosity, appropriately small optical anisotropy and appropriate dielectric anisotropy and is suitable to be used in a liquid crystal display device.

Example 6

The liquid crystal composition of Example 6 is prepared according to each compound and weight percentage listed in Table 8 and is tested by filling the same between two substrates of a liquid crystal display device. The test data are shown in the Table below:

TABLE 8

The formulation of the liquid crystal composition
and the test performances thereof

| Codes of the components | Codes of the structures | Content percentage | Test results for the performance parameters | |
|---|---|---|---|---|
| 3CPWO2 | V-1 | 5 | Δn | 0.1125 |
| 3CPWO4 | V-3 | 4 | Δε | −11.6 |
| 3CPWO3 | V-2 | 3 | Cp | 83.8 |
| 3CCWO2 | IV-16 | 5 | η | 52 |
| 3C1OWO2 | IV-26 | 8 | Is (initial) | 0.04 |
| 2C1OWO2 | IV-25 | 5 | Is (UV) | 0.08 |
| 4C1OWO2 | IV-27 | 5 | | |
| 5C1OWO2 | IV-28 | 5 | | |
| 2CC1OWO2 | IV-33 | 7 | | |
| 3CC1OWO2 | IV-34 | 9 | | |
| 3CC1OWO3 | IV-38 | 6 | | |
| 4CC1OWO2 | IV-35 | 6 | | |
| 3C1OWWO2 | I-6 | 9 | | |
| 4C1OWWO2 | I-7 | 9 | | |
| 5C1OWWO2 | I-8 | 9 | | |
| 3CC(N)5 | II-6 | 5 | | |
| Total | | 100 | | |

As compared with Comparative Example 1, the Is (initial) and Is (UV) of this liquid crystal composition are smaller. Under same voltage condition, smaller current value means higher resistivity and better reliability of liquid crystal materials. In addition, this liquid crystal composition has lower viscosity, appropriately large optical anisotropy and appropriately large dielectric anisotropy and is suitable to be used in a liquid crystal display device.

Example 7

The liquid crystal composition of Example 7 is prepared according to each compound and weight percentage listed in Table 9 and is tested by filling the same between two substrates of a liquid crystal display device. The test data are shown in the Table below:

TABLE 9

The formulation of the liquid crystal composition and the test performances thereof

| Codes of the components | Codes of the structures | Content percentage | Test results for the performance parameters | |
|---|---|---|---|---|
| 3CCWO2 | IV-16 | 5 | Δn | 0.086 |
| 3C1OWO2 | IV-26 | 8 | Δε | −11.2 |
| 2C1OWO2 | IV-25 | 7 | Cp | 81 |
| 4C1OWO2 | IV-27 | 8 | η | 57 |
| 5C1OWO2 | IV-28 | 8 | Is (initial) | 0.05 |
| 2CC1OWO2 | IV-33 | 7 | Is (UV) | 0.07 |
| 3CC1OWO2 | IV-34 | 7 | | |
| 3CC1OWO3 | IV-38 | 4 | | |
| 4CC1OWO2 | IV-35 | 7 | | |
| 5CC1OWO2 | IV-36 | 5 | | |
| 3C1OWWO2 | I-6 | 5 | | |
| 4C1OWWO2 | I-7 | 4 | | |
| 3CC1OWWO2 | I-22 | 6 | | |
| 3CC(N)4 | II-5 | 5 | | |
| 3CC(N)6 | II-7 | 7 | | |
| 3CC(N)5 | II-6 | 7 | | |
| Total | | 100 | | |

As compared with Comparative Example 1, the Is (initial) and Is (UV) of this liquid crystal composition are smaller. Under same voltage condition, smaller current value means higher resistivity and better reliability of liquid crystal materials. In addition, this liquid crystal composition has lower viscosity, appropriate optical anisotropy and appropriately large dielectric anisotropy and is suitable to be used in a liquid crystal display device.

The foregoing descriptions are merely preferred examples of the present invention and are not intended to limit the present invention in any form. Although the present invention has been disclosed by the preferred examples as described above, it is not intended to limit the present invention. Without departing from the scope of the technical solutions of the present invention, some changes may be made and equivalent examples can be modified through equivalent variations by those skilled in the art by means of the technical contents disclosed above. Without departing from the content of the technical solutions of the present invention, any simple amendment, equivalent change or modification of the above examples according to the technical essence of the present invention still falls within the scope of the technical solutions of the present invention.

What is claimed is:

1. A liquid crystal composition, comprising:
   at least one compound selected from a group consisting of compounds of general formula I

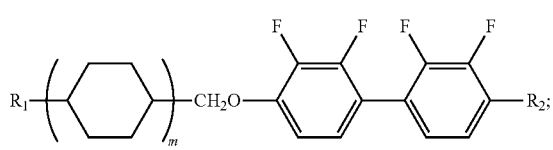

and
   at least one compound selected from a group consisting of compounds of general formula II

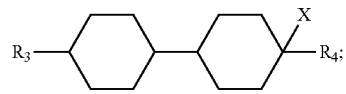

wherein:
$R_1$ and $R_2$ are same or different, and each independently represents $C_1$-$C_7$ linear alkyl, $C_1$-$C_7$ linear alkoxy;
$R_3$ and $R_4$ are same or different, and each independently represents $C_1$-$C_7$ linear alkyl;
X represents $CF_3$; and
m represents 1 or 2;
wherein the liquid crystal composition further comprises at least one compound selected from a group consisting of compounds of general formula III

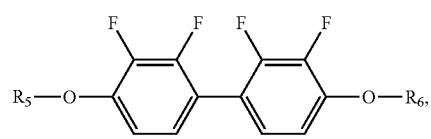

wherein,
$R_5$ and $R_6$ are same or different, and each independently represents $C_1$-$C_{10}$ linear alkyl, and
wherein the liquid crystal composition further comprises at least one compound of general formulas IV and V

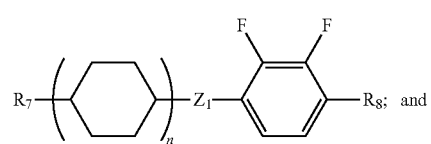

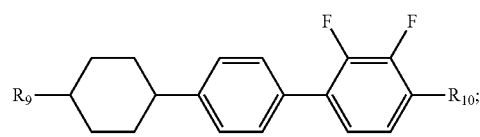

wherein,
$R_7$, $R_8$, $R_9$ and $R_{10}$ are same or different, and each independently represents $C_1$-$C_7$ linear alkyl, $C_1$-$C_7$ linear alkoxy;
$Z_1$ represents a single bond, —$CH_2O$— or —COO—;
n represents 1 or 2.

2. The liquid crystal composition according to claim 1, wherein the compound of general formula III is selected from a group consisting of the following compounds:

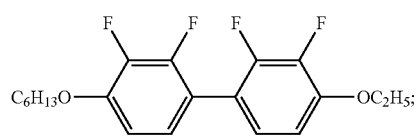

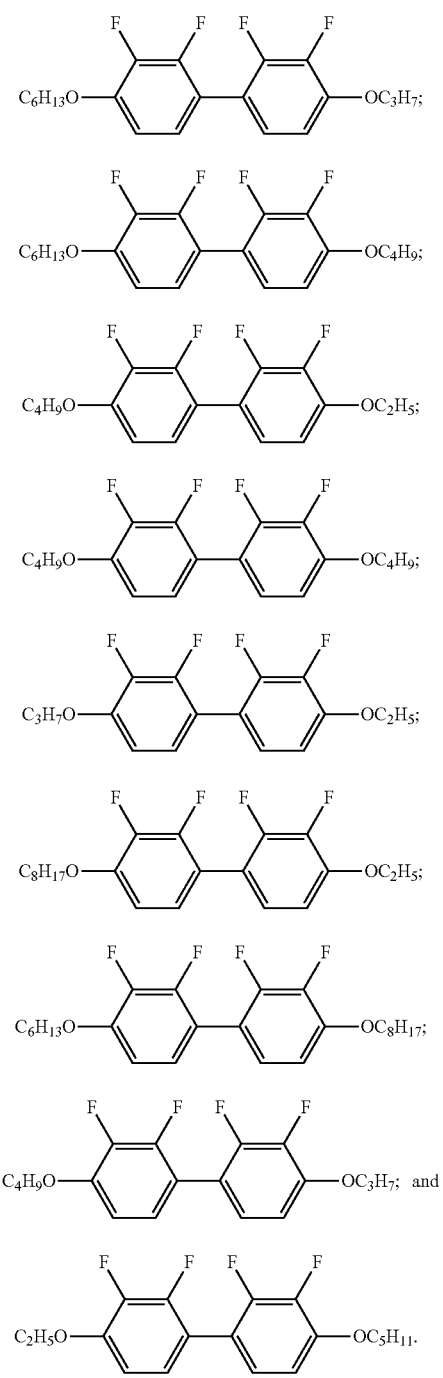
3. The liquid crystal composition according to claim 1, wherein the compound of general formula IV is selected from a group consisting of the following compounds:
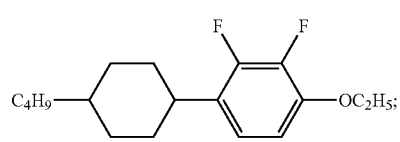
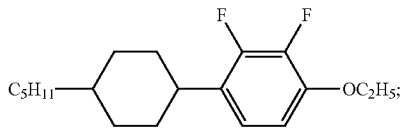
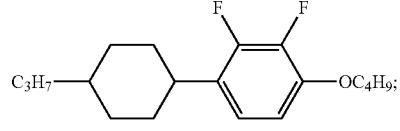
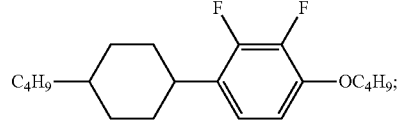
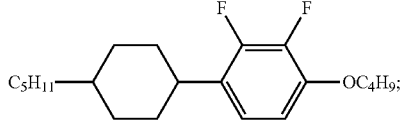
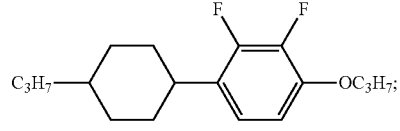
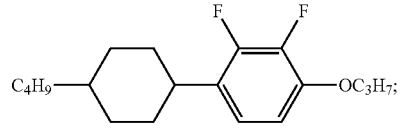
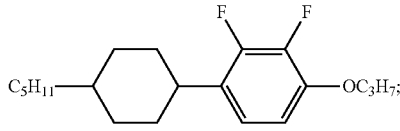
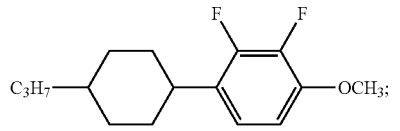
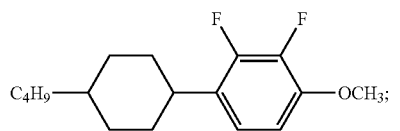
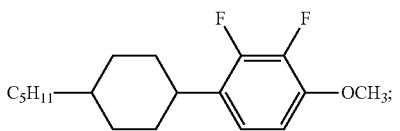

IV-13
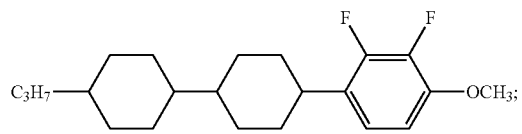
IV-14
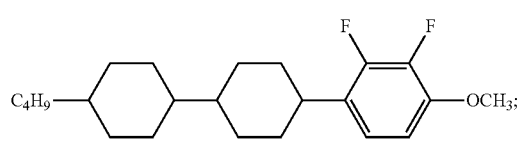
IV-15
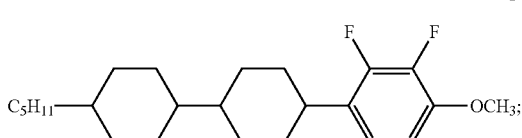
IV-16
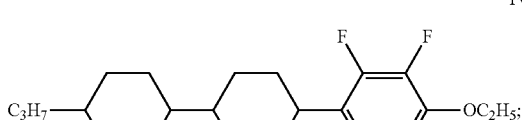
IV-17
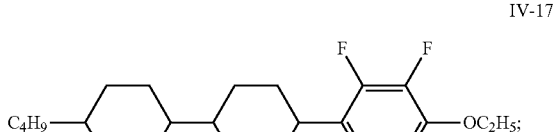
IV-18
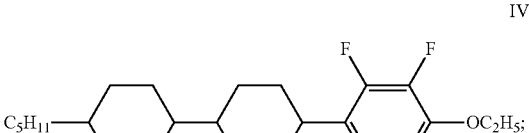
IV-19
IV-20
IV-21
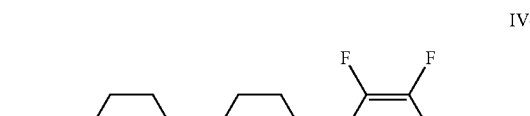
IV-22
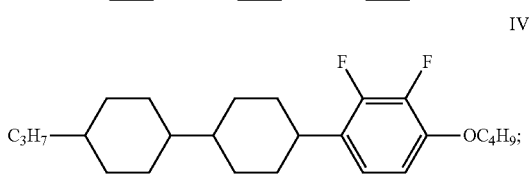
IV-23
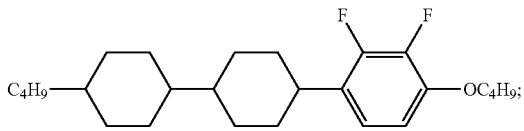
IV-24
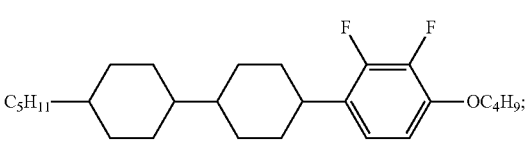
IV-25
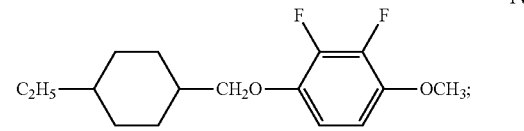
IV-26
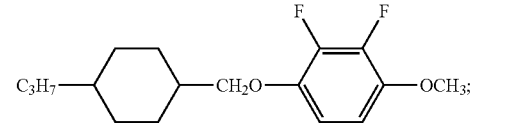
IV-27
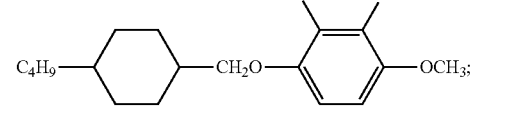
IV-28
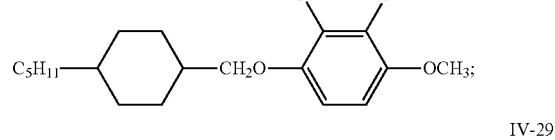
IV-29
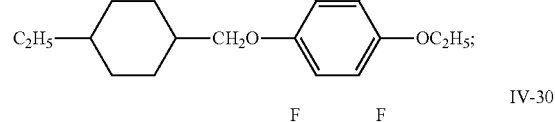
IV-30
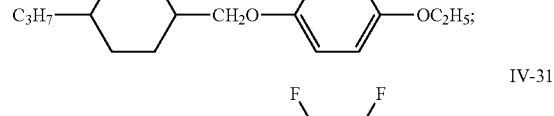
IV-31
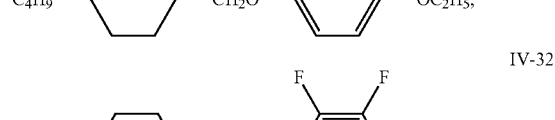
IV-32
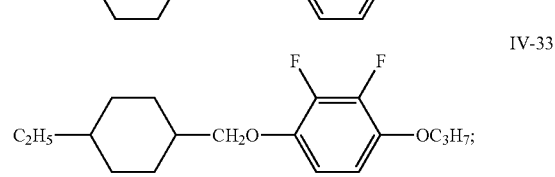
IV-33

-continued
IV-34
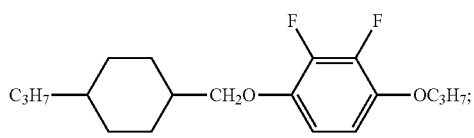
IV-35
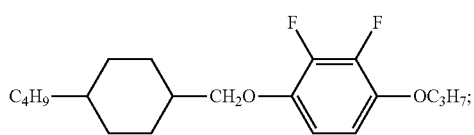
IV-36
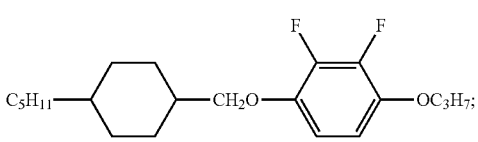
IV-37
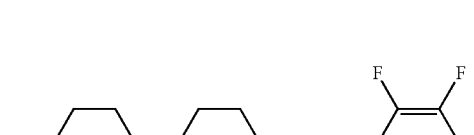
IV-38
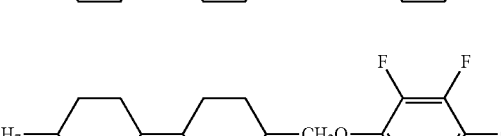
IV-39
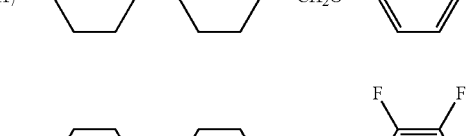
IV-40
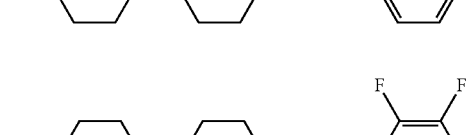
IV-41
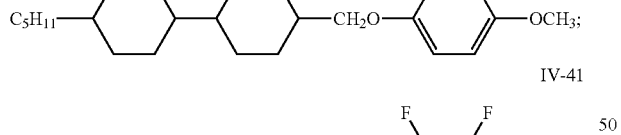
IV-42
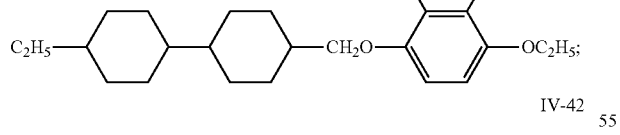
IV-43
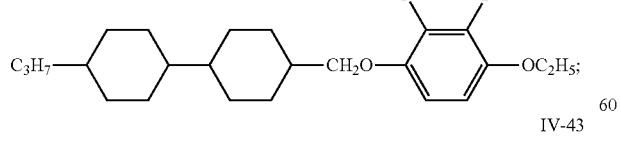
-continued
IV-44
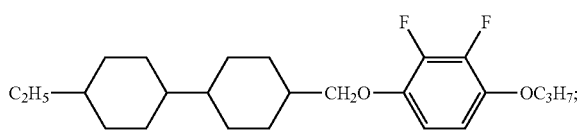
IV-45
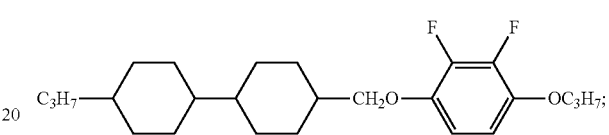
IV-46
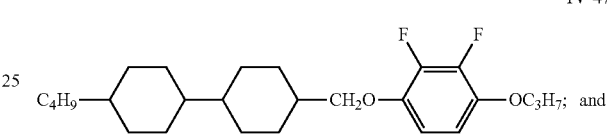
IV-47
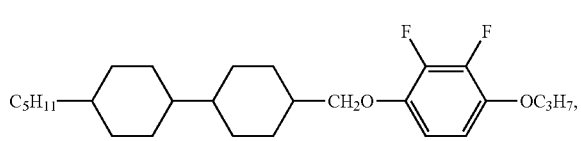
IV-48
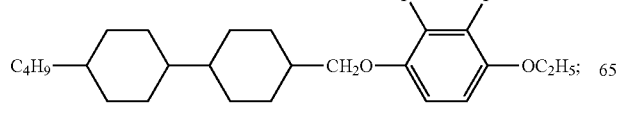
wherein the compound of general formula V is selected from a group consisting of the following compounds:
V-1
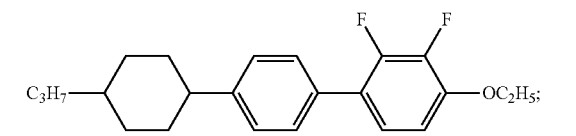
V-2
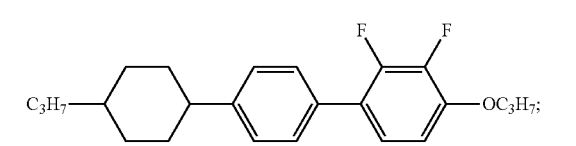
V-3
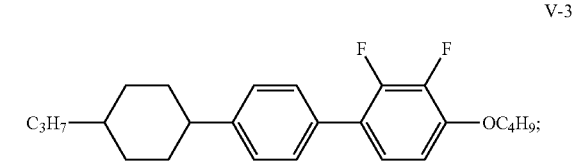
V-4
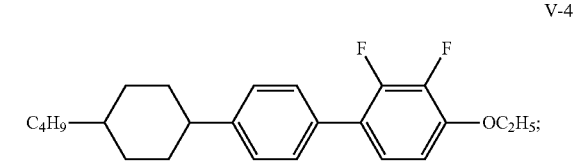

-continued

V-5
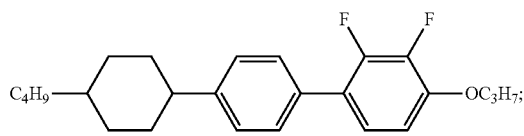

V-6
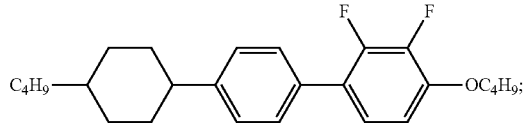

V-7
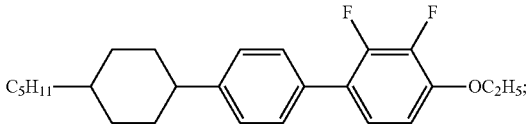

V-8
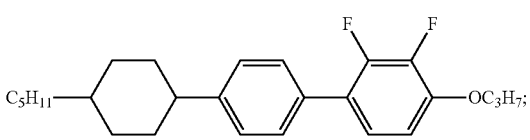

V-9
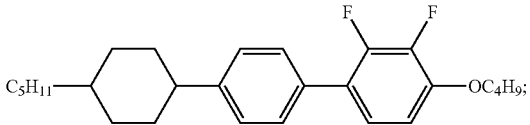

V-10
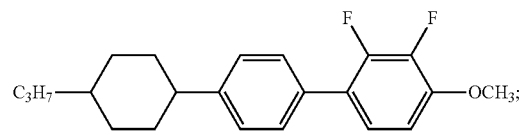

V-11
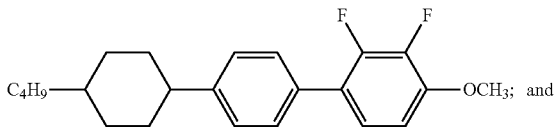

V-12
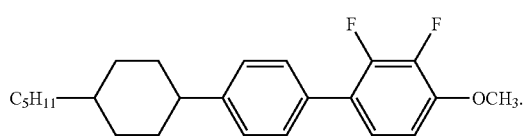

4. The liquid crystal composition according to claim 1, wherein the liquid crystal composition further comprises at least one compound of general formula VI VI
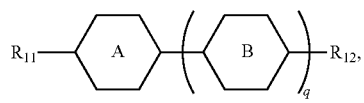

wherein $R_{11}$ and $R_{12}$ are same or different, and each independently represents $C_1$-$C_7$ linear alkyl, $C_1$-$C_7$ linear alkoxy, $C_2$-$C_5$ linear alkenyl;

rings

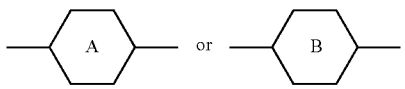

are same or different, and each independently represents

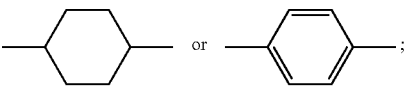

q represents 1 or 2;

when q represents 2, two rings

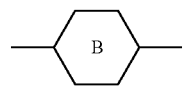

are same or different, and each independently represents

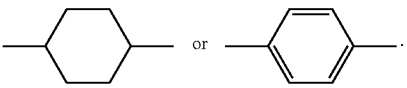

5. The liquid crystal composition according to claim 4, wherein the compound of general formula VI is selected from a group consisting of the following compounds:

VI-1
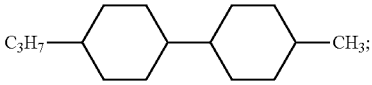

VI-2
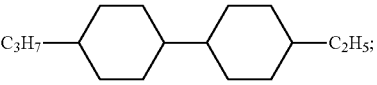

VI-3
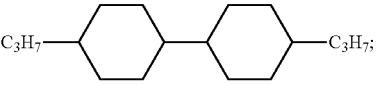

VI-4
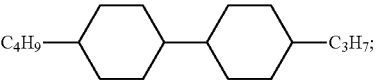

VI-5
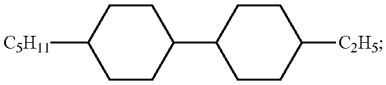

VI-6
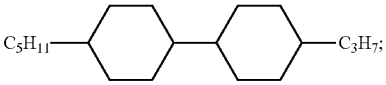

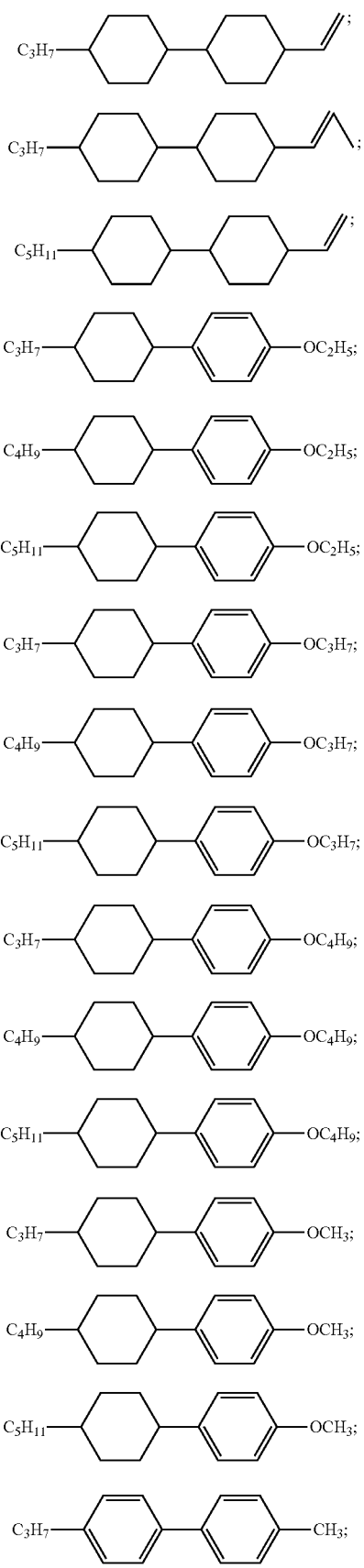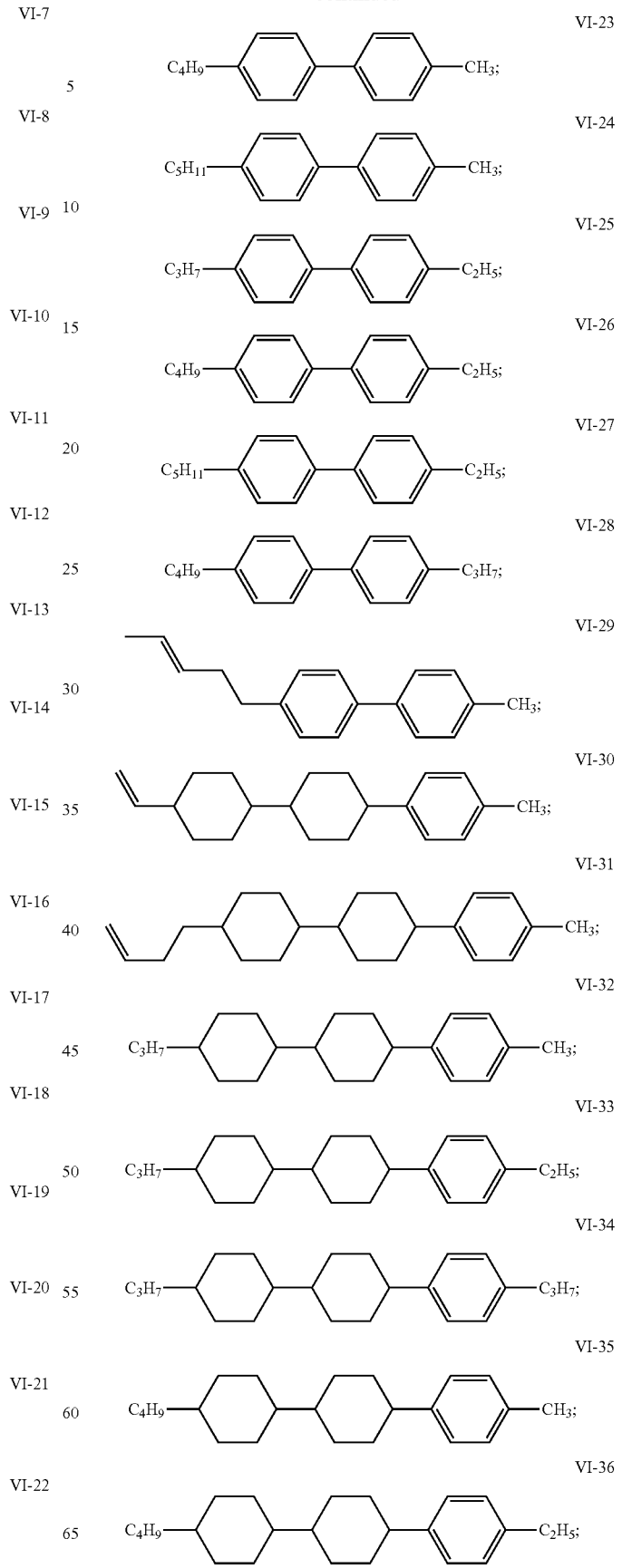

-continued

VI-37

VI-38

VI-39

VI-40
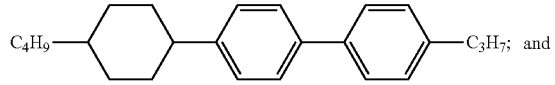

VI-41

6. The liquid crystal composition according to claim 1, wherein the liquid crystal composition further comprises at least one compound of general formula VII VII
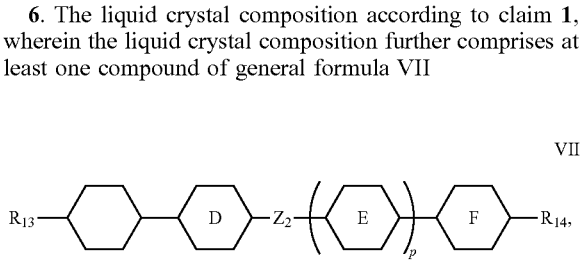

wherein, $R_{13}$ and $R_{14}$ are same or different, and each independently represents $C_1$-$C_7$ linear alkyl, $C_1$-$C_7$ linear alkoxy;

rings

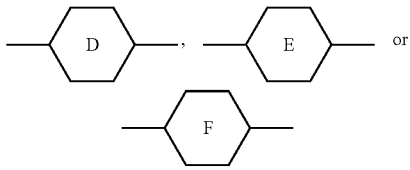

are same or different, and each independently represents

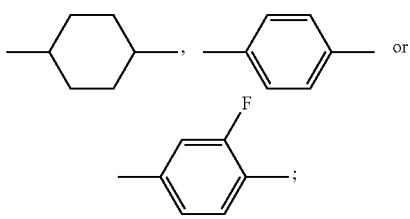

$Z_2$ represents a single bond, —$CH_2O$— or —COO—;
p represents 0 or 1;
when $Z_2$ represents a single bond, p represents 1.

7. The liquid crystal composition according to claim 6, wherein the compound of general formula VII is selected from a group consisting of the following compounds:

VII-1
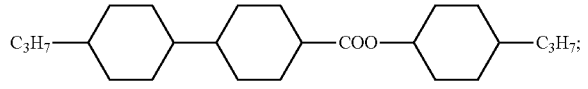

VII-2
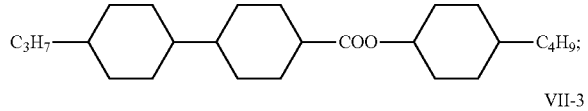

VII-3
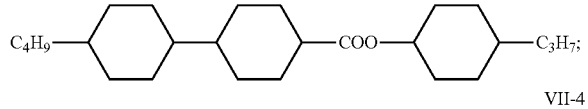

VII-4
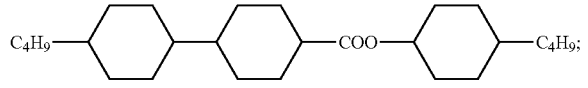

VII-5
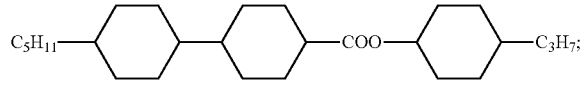

VII-6
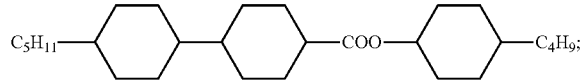

VII-7
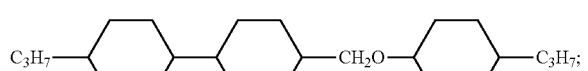

VII-8
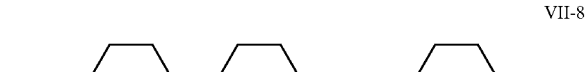

VII-9
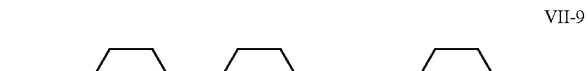

VII-10
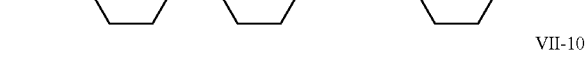

VII-11
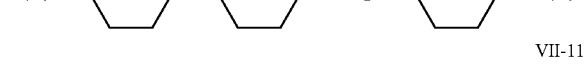

VII-12
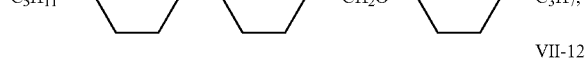

VII-13
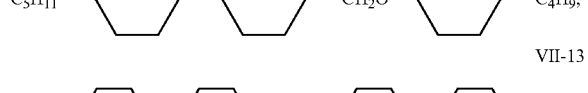

VII-14
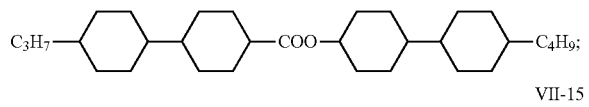
VII-15
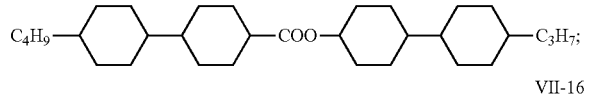
VII-16
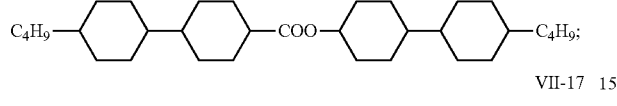
VII-17
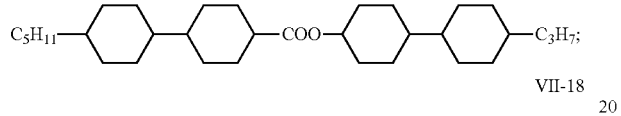
VII-18
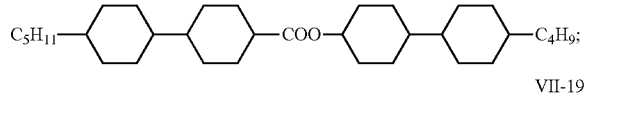
VII-19
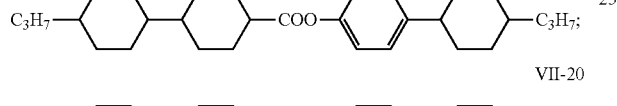
VII-20
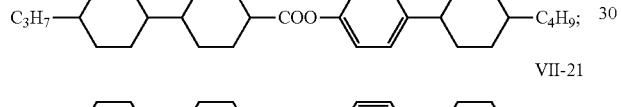
VII-21
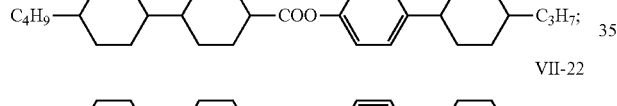
VII-22
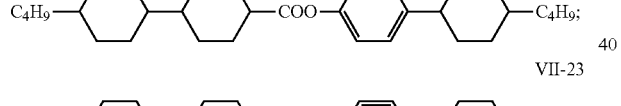
VII-23
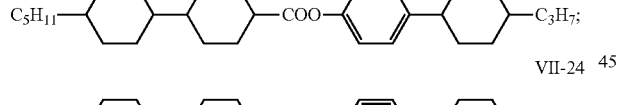
VII-24
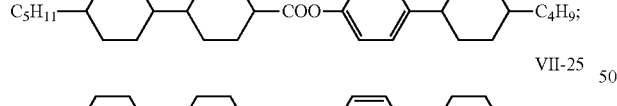
VII-25
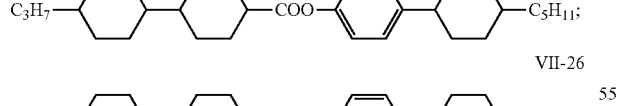
VII-26
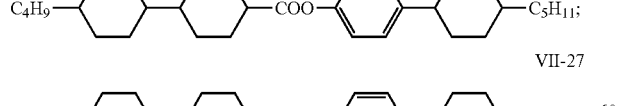
VII-27
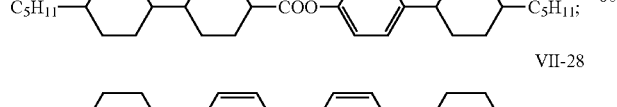
VII-28
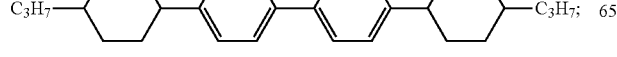
VII-29
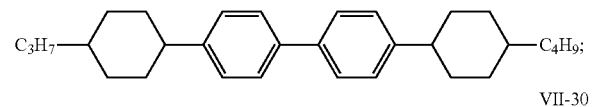
VII-30
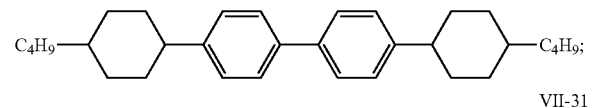
VII-31
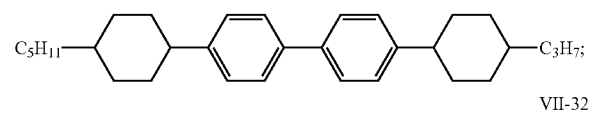
VII-32
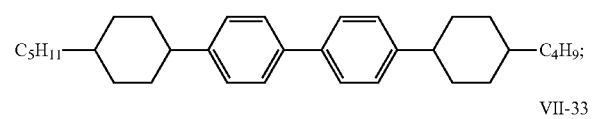
VII-33
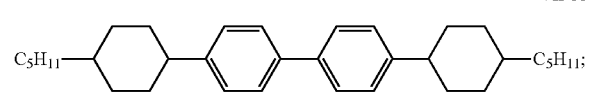
VII-34
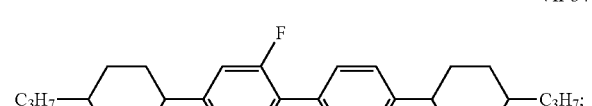
VII-35
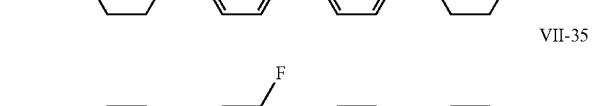
VII-36
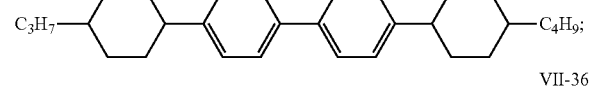
VII-37
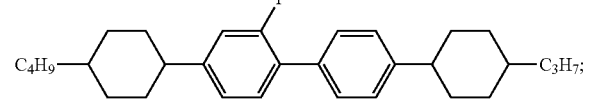
VII-38
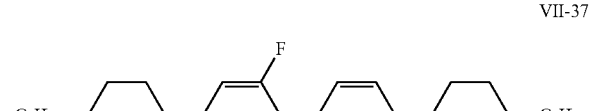
VII-39
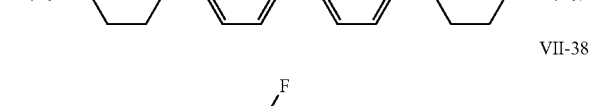
VII-40
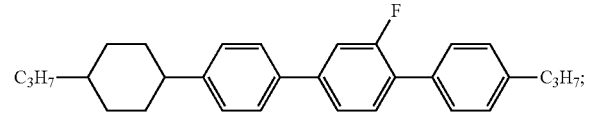

VII-41
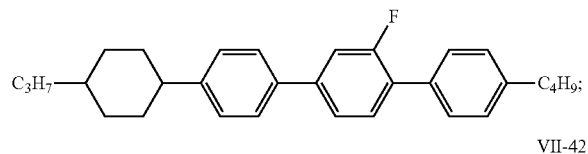
VII-42
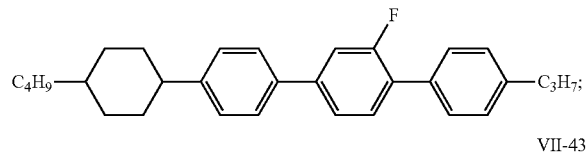
VII-43
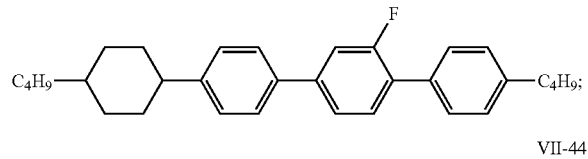
VII-44
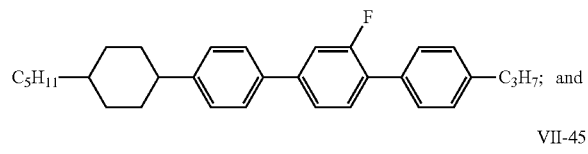
VII-45
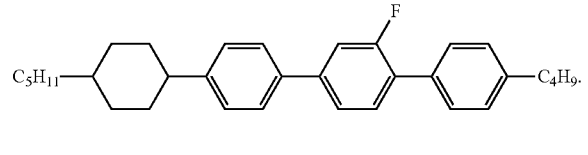
8. A liquid crystal display device comprising the liquid crystal composition of claim 1.
9. The liquid crystal composition according to claim 1, wherein the compound of general formula I is selected from a group consisting of the following compounds:
I-1
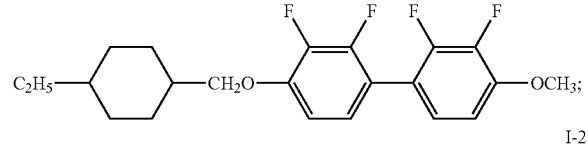
I-2
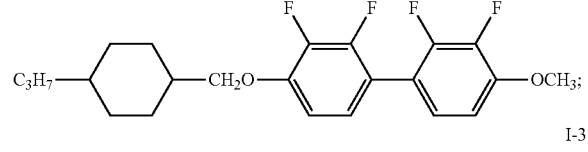
I-3
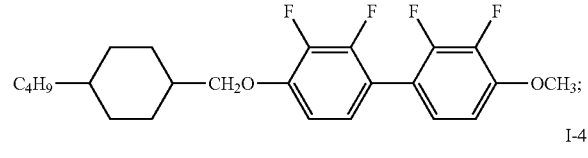
I-4
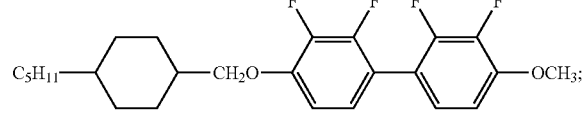
I-5
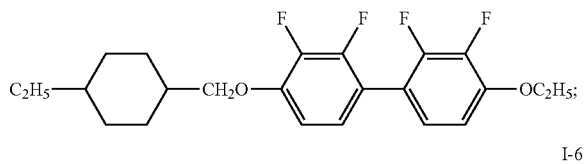
I-6
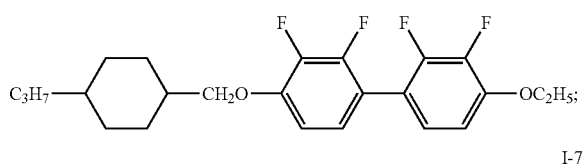
I-7
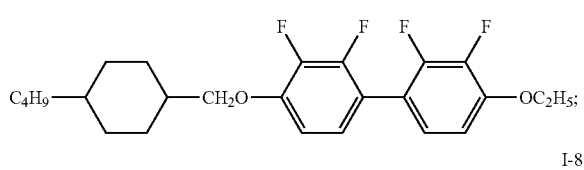
I-8
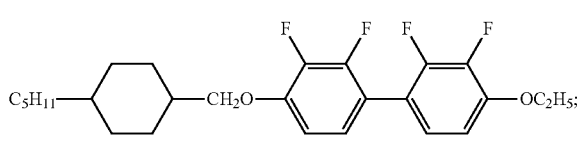
I-9
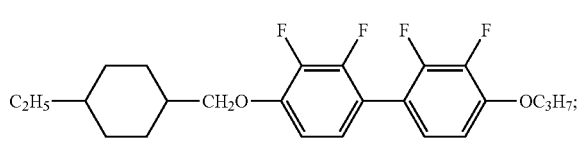
I-10
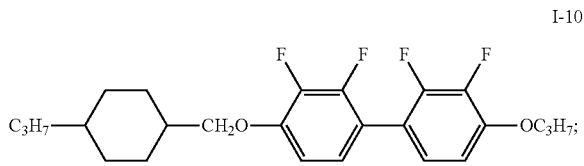
I-11
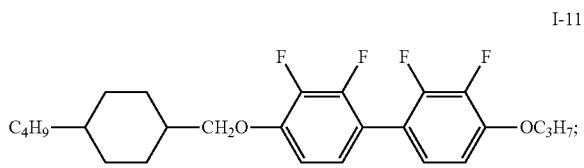
I-12
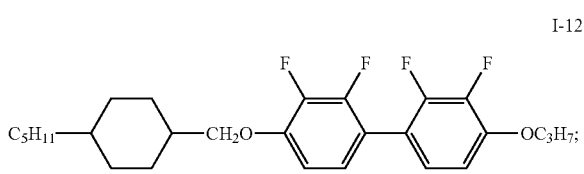
I-13
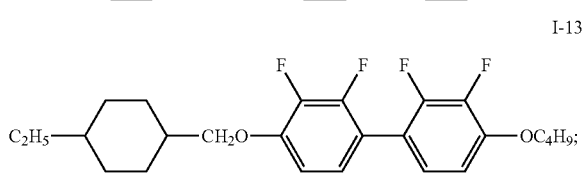
I-14
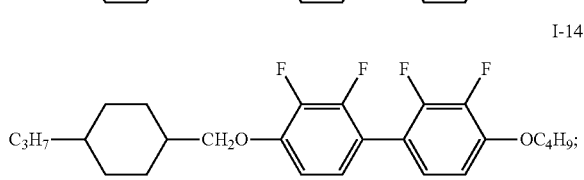

-continued
I-15
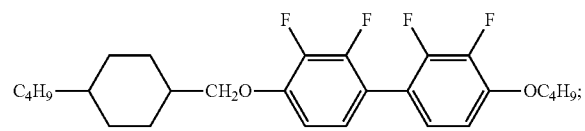
I-16
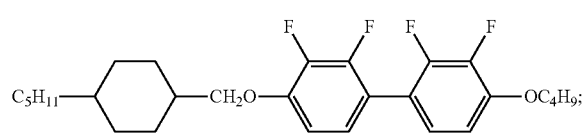
I-17
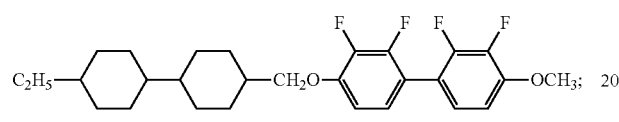
I-18
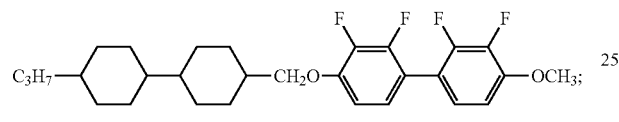
I-19
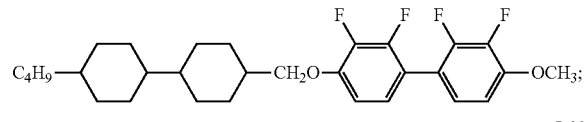
I-20
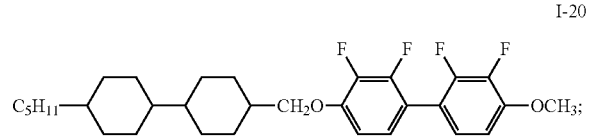
I-21
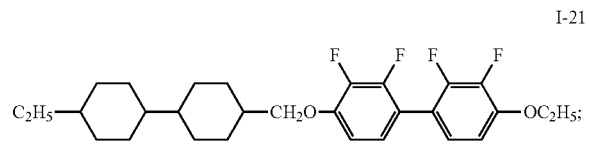
I-22
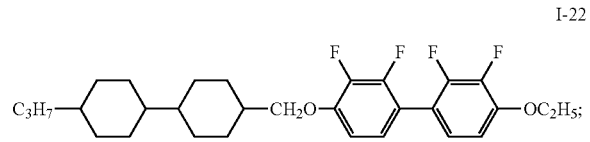
I-23
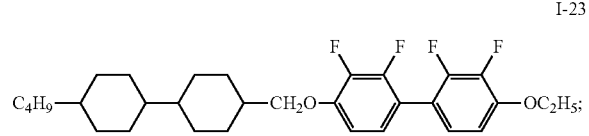
I-24
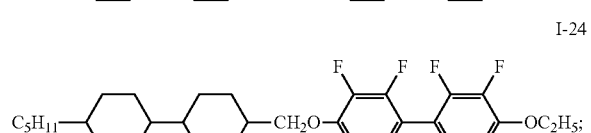
I-25
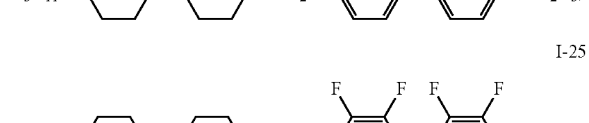
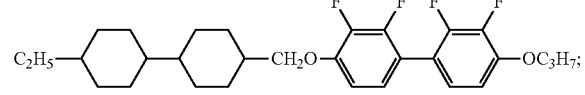
-continued
I-26
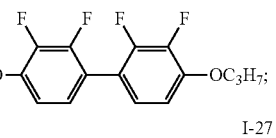
I-27
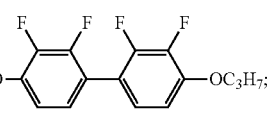
I-28
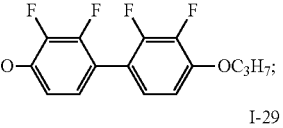
I-29
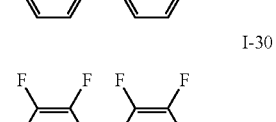
I-30
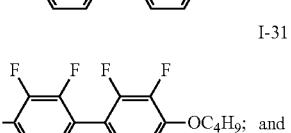
I-31
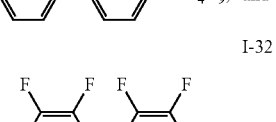
I-32
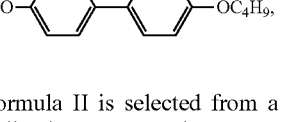
the compound of general formula II is selected from a group consisting of the following compounds:
II-16
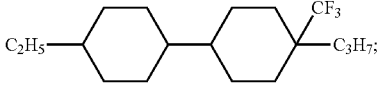
II-17
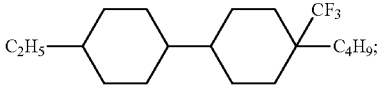
II-18
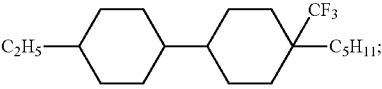
II-19
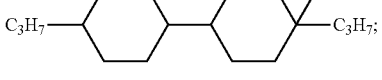
II-20
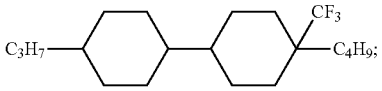

-continued
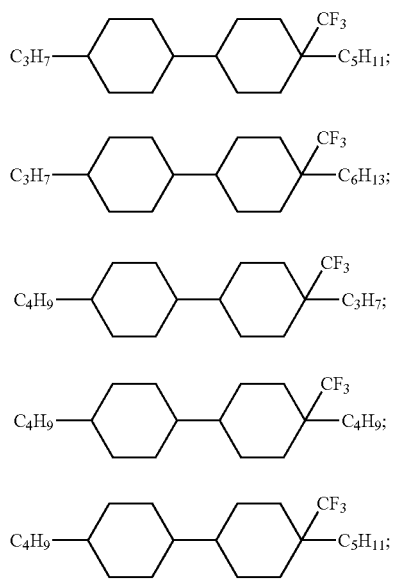
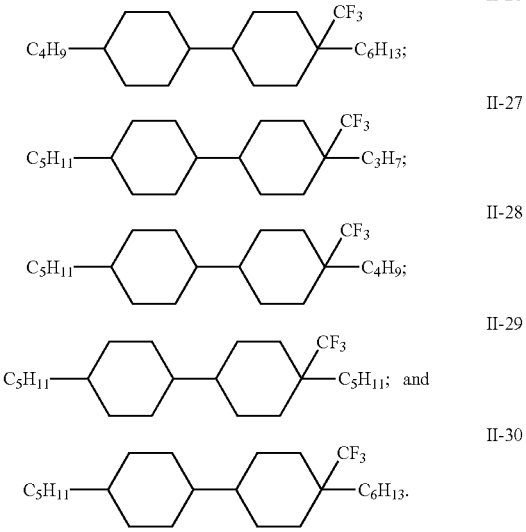
* * * * *